United States Patent [19]

Claar et al.

[11] Patent Number: 5,403,790
[45] Date of Patent: Apr. 4, 1995

[54] ADDITIVES FOR PROPERTY MODIFICATION IN CERAMIC COMPOSITE BODIES

[75] Inventors: Terry D. Claar, Newark; Gerhard H. Schiroky, Hockessin, both of Del.; Kevin P. Pochopien, Oxford, Pa.; Vilupanur A. Ravi, Bear, Del.; James C. Wang, San Diego, Calif.; Ratnesh K. Dwivedi, Wilmington, Del.

[73] Assignee: Lanxide Technology Company, LP, Newark, Del.

[21] Appl. No.: 960,407

[22] PCT Filed: Jul. 12, 1991

[86] PCT No.: PCT/US91/04951

§ 371 Date: Jan. 11, 1993

§ 102(e) Date: Jan. 11, 1993

[87] PCT Pub. No.: WO92/00933

PCT Pub. Date: Jan. 23, 1992

Related U.S. Application Data

[63] Continuation-in-part of Ser. No. 551,903, Jul. 12, 1990, abandoned, which is a continuation-in-part of Ser. No. 282,462, Dec. 9, 1988, abandoned, which is a continuation-in-part of Ser. No. 137,397, Dec. 23, 1987, abandoned.

[51] Int. Cl.$^6$ .......................... C04B 35/58; B22F 3/26
[52] U.S. Cl. ......................... 501/87; 501/96; 501/99; 501/102; 419/12; 419/14; 419/15; 419/16
[58] Field of Search .............. 419/12, 14, 15, 16; 501/96, 99, 102, 87

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |

(List continued on next page.)

FOREIGN PATENT DOCUMENTS

| | | |
|---|---|---|
| 0113249 | 7/1984 | European Pat. Off. . |
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"–M. Drouzy and M. Richard–Mar., 1974 Fonderie, France No. 332 pp. 121–128.

"Refractories for Aluminum Alloy Melting Furnaces" –B. Clavaud and V. Jost–Sep., 1980–Lillian Brassinga (from French) Jan., 1985.

*Primary Examiner*—Mark L. Bell
*Assistant Examiner*—C. M. Bonner
*Attorney, Agent, or Firm*—Mark G. Mortenson; Carol A. Lewis

[57] ABSTRACT

This invention relates generally to a novel method of manufacturing a composite body. More particularly, the present invention relates to a method for modifying the resultant properties of a composite body, by, for example, minimizing the amount of porosity present in the composite body. Moreover, additives, whether used alone or in combination, (1) can be admixed with the permeable mass, (2) can be mixed or alloyed with the parent metal, (3) can be placed at an interface between the parent metal and the preform or mass of filler material, (4) or any combination of the aforementioned methods, to modify properties of the resultant composite body. Particularly, additives such as VC, NbC, WC, $W_2B_5$, TaC, ZrC, $ZrB_2$, $SiB_6$, SiC, MgO, $Al_2O_3$, $ZrO_2$, $CeO_2$, $Y_2O_3$, $La_2O_3$, $MgAl_2O_4$, $HfO_2$, $ZrSiO_4$, $Yb_2O_3$ and $Mo_2B_5$ can be combined with the permeable mass in an amount of about 5–50 percent by weight, prior to reactively infiltrating the permeable mass. Moreover, an additive may also include substantially pure elemental metals (e.g., Nb, Ti, Hf, V, Ta, Cr, Mo, Al, Cr, Si, Co and W) which may be provided by any of the methods discussed above herein.

15 Claims, 15 Drawing Sheets

U.S. PATENT DOCUMENTS

| | | | |
|---|---|---|---|
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,946,039 | 3/1976 | Walz | 264/59 |
| 3,973,977 | 8/1976 | Wilson | 106/62 |
| 4,011,291 | 3/1977 | Curry | 264/43 |
| 4,559,244 | 12/1985 | Kaspizyk et al. | 501/82 |
| 4,713,360 | 12/1987 | Newkirk et al. | 501/98 |
| 4,808,558 | 2/1989 | Park et al. | 264/59 |
| 4,885,130 | 12/1989 | Claar et al. | 419/12 |
| 4,891,338 | 1/1990 | Gesing et al. | 501/87 |
| 4,940,679 | 7/1990 | Claar et al. | 501/96 |
| 5,017,334 | 5/1991 | Claar et al. | 419/12 |
| 5,180,697 | 1/1993 | Claar et al. | 501/96 |

ADDITIVES FOR PROPERTY MODIFICATION IN CERAMIC COMPOSITE BODIES

This application is a continuation-in-part of U.S. application Ser. No. 07/551,903, now abandoned, filed Jul. 12, 1990, in the names of Terry Dennis Claar et al., which is a continuation-in-part of application Ser. No. 07/282, 462, now abandoned, filed Dec. 9, 1988, in the names of Terry Dennis Claar et al., which is a continuation-in-part of application Ser. No. 07/137,397, now abandoned, filed Dec. 23, 1987, in the names of Terry Dennis Claar et al., and all of which are entitled "A Method of Producing and Modifying the Properties of Ceramic Composite Bodies." The subject matter of each of the above-identified applications is hereby expressly incorporated by reference.

TECHNICAL FIELD

This invention relates generally to a novel method of manufacturing a ceramic composite body, for example, a $ZrB_2$-$ZrC$-$Zr$ composite body (hereinafter referred to as "ZBC" composite body). More particularly the present invention relates to a method for modifying the resultant properties of a ceramic composite body, by, for example, minimizing the amount of porosity present in the composite body. The composite body comprises one or more boron-containing compounds (e.g., a boride or a boride and a carbide) which has been made by the reactive infiltration of a molten parent metal into a bed or mass containing boron carbide, an additive material, and optionally one or more inert fillers, to form the composite body. Particular emphasis is placed upon modifying the properties of a ZBC composite body (e.g., reactively infiltrating a mass containing boron carbide with a zirconium parent metal). However, the methods disclosed herein are believed to be generic to a number of different parent metals.

BACKGROUND ART

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well khown. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

DESCRIPTION OF COMMONLY OWNED U.S. PATENTS AND PATENT APPLICATIONS

Many of the above-discussed problems associated with the production of boride-containing materials have been addressed in commonly owned and co-pending U.S. patent application Ser. No. 07/551,306, filed on Jul. 12, 1990, in the names of Terry Dennis Claar et al, which is a continuation-in-part of U.S. patent application Ser. No. 07/446,433, filed on Dec. 5, 1989, in the names of Terry Dennis Claar et al., as a continuation of commonly owned U.S. patent application Ser. No. 07/296,771, which issued on Dec. 5, 1989, as U.S. Pat. No. 4,885,130. U.S. patent application Ser. No. 07/296,771, was a continuation-in-part of U.S. patent application Ser. No. 07/137,044, filed on Dec. 23, 1987, and now allowed, in the names of Terry Dennis Claar et al., which was a continuation-in-part of U.S. patent application Ser. No. 07/073,533, filed in the names of Danny R. White, Michael K. Aghajanian and T. Dennis Claar, on Jul. 15, 1987, and entitled "Process for Preparing Self-Supporting Bodies and Products Made Thereby". The above-discussed series of applications and Patent are hereinafter sometimes referred to as "the '433 Series".

Briefly summarizing the disclosure of the '433 Series, self-supporting ceramic bodies are produced by utilizing a parent metal infiltration and reaction process (i.e., reactive infiltration) in the presence of a (1) boron carbide or (2) boron carbide and at least one of a boron donor material and/or a carbon donor material or (3) a boron donor material and a carbon donor material. Particularly, for example, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that, for example, the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of the '433 Series, a mass comprising, for example, boron carbide is placed adjacent to or in contact with a body of molten metal or metal alloy, which is melted in a substantially inert environment within a particular temperature envelope. The molten metal infiltrates the boron carbide mass and reacts with at least the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in the '433 Series, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as, for example, the initial density of the boron carbide body, the amount of boron donor material and/or carbon donor material relative to boron carbide and parent metalathe relative amounts of boron carbide and parent metal, alloys of the parent metal, dilution of the boron carbide with a filler, temperature, and time, etc. Preferably, conversion of the boron carbide and/or boron donor material and/or carbon donor material to the parent metal boride, parent metal boro compound(s) and parent metal carbide is at least about 50%, and most preferably at least about 90%.

The typical environment or atmosphere which was utilized in the '433 Series was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also affect the morphology of the resultant material.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity. The methods of Patent '131 were improved upon by copending U.S. application Ser. No. 07/551,747, filed on Jul. 12, 1990, in the names of Marc S. Newkirk et al., which was a continuation-in-part of U.S. Pat. No. 5,010,044, which issued on Apr. 23, 1991, in the name of Marc S. Newkirk, which was a continuation of Patent '131.

In another related patent application, specifically, copending U.S. patent application Ser. No. 07/551,486, filed on Jul. 12, 1990, in the names of Terry Dennis Cla ar et al., which is a continuation-in-part of U.S. patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. The above-discussed series of applications are hereinafter sometimes referred to as "the '486 Series". Specifically, the '486 Series discloses various techniques for shaping a bed or mass comprising boron carbide into a predetermined shape and thereafter reactively infiltrating the bed or mass comprising boron carbide to form a self-supporting body of a desired size and shape.

U.S. Pat. No. 5,011,063 (hereinafter "Patent '063") which issued on Apr. 30, 1991, in the name of Terry Dennis Claar, and entitled "A Method of Bonding A Ceramic Composite Body to a Second Body and Articles Produced Thereby", discloses various bonding techniques for bonding self-supporting bodies to second materials. Particularly, this Patent discloses that a bed or mass comprising one or more boron-containing compounds is reactively infiltrated by a molten parent metal to produce a self-supporting body. Moreover, residual or excess metal, is permitted to remain bonded to the formed self-supporting body. The excess metal is utilized to form a bond between the formed self-supporting body and another body (e.g., a metal body or a ceramic body of any particular size or shape). The methods of Patent '063 were improved upon by copending and related U.S. application Ser. No. 07/551,290, filed on Jul. 12, 1990, in the name of Terry Dennis Claar.

The reactive infiltration of a parent metal into a bed or mass comprising boron nitride is disclosed in U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in copending U.S. patent application Ser. No. 07/296,966 (hereinafter "Application '966"), filed in the names of Terry Dennis Claar et al., on Jan. 13, 1989, and entitled "A Method of Modifying Ceramic Composite Bodies By Post-Treatment Process and Articles Produced Thereby". Specifically, Application '966 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

U.S. Pat. No. 5,019,539 (hereinafter "Patent '539"), which issued in the names of Terry Dennis Claar et al., on May 28, 1991, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

The present invention has been developed in view of the foregoing and to overcome the deficiencies of the prior art.

One aspect of the invention provides a method for controlling or reducing the amount of porosity present in a composite body. More particularly, the amount of porosity can be reduced by utilizing at least one of two different methods, taken alone or in combination. The first method relates to admixing an additive material comprising at least one of tantalum carbide, zirconium carbide, and/or zirconium diboride with a permeable mass of reactant material (e.g., boron carbide), prior to reactively infiltrating the mass with a parent metal. The second method utilizes a particular zirconium parent metal (e.g., a zirconium sponge) as the parent metal for forming a composite body. By reducing the amount of porosity in these composite bodies, the machining required to remove undesirable porosity can be reduced, if not completely eliminated.

Broadly, in accordance with a first feature of the invention, an additive material comprising at least one of tantalum carbide (TaC), zirconium carbide (ZrC), silicon carbide (SiC) and/or zirconium diboride ($ZrB_2$) can be admixed with a boron and/or carbon containing material (e.g., $B_4C$) to form a permeable mass which is to be reactively infiltrated. Further, an additive material may comprise at least one of the following refractory oxides or borides: alumina ($Al_2O_3$), magnesia (MgO), spinel (e.g., $MgAl_2O_4$), yttria ($Y_2O_3$), lanthanum oxide ($La_2O_3$), calcium oxide (CaO), hafnium oxide ($HfO_2$), borides of silicon (e.g., $SiB_6$, $SiB_4$), zirconium oxide ($ZrO_2$), cerium oxide ($CeO_2$), ytterbium oxide ($Yb_2O_3$), zircon ($ZrSiO_4$) etc. The above-discussed additive materials can be added in an amount of about 5–50 percent by weight. After admixing the raw materials together, the same can be formed into a preform, in accordance with, for example, the disclosure in the '433 Series.

Still further, in accordance with a second feature of the invention, a zirconium metal sponge containing less than 1000 ppm by weight tin, preferably less than 500 ppm by weight tin, as an alloyed contaminant, can be utilized as a parent metal instead of the parent metal disclosed in the '433 Series, which contained about 1000–2000 ppm, by weight, tin. By utilizing either of the above-broadly disclosed methods, a composite body having a reduced amount of porosity can be formed.

In addition, other additive materials, alone or in combination, (1) can be admixed with the boron and/or carbon containing material (e.g., boron carbide), (2) can be mixed or alloyed with the parent metal, (3) can be placed at an interface between the parent metal and the preform or mass of filler material (e.g., a preform comprising boron carbide, a filler material and an additive material), or (4) and combination of the aforementioned methods, to modify the properties of the resultant composite body. Particularly, additive materials such as VC, NbC, WC, $W_2B_5$ and $Mo_2B_5$ can be combined with the $B_4C$ material in an amount of about 5–50 percent by weight, prior to reactively infiltrating the $B_4C$ material. These additive materials, as well as those discussed above (i.e., $CeO_2$, TaC, ZrC and $ZrB_2$), may affect such properties as hardness, modulus of elasticity, density and grain size. Further, additive materials may comprise refractory oxides such as ($CeO_2$, MgO, $ZrO_2$, $Y_2O_3$, stabilized $ZrO_2$, etc.) which may be admixed with the permeable mass to be reactively infiltrated in order to, for example, enhance the creep-resistance of the formed composite body.

Moreover, depending upon the process conditions (e.g., temperature) and the particular reactive infiltration system (i.e., combination of parent metal, permeable mass, atmosphere, etc.) selected an additive material may also include substantially pure elemental metals and alloys (e.g., aluminum, silicon, chromium, titanium, niobium, nickel, cobalt, etc., which may be provided by any of the methods discussed above herein). Further, a metal such as titanium can serve as both a parent metal and an additive material. Typically, the relative quantity of a particular metal may determine which metal functions primarily as the parent metal (e.g., a metal having the greater quantity tends to correspond to a parent metal as defined above herein). However, at least a portion of an additive material comprising a metal may also react with the permeable mass of material to form an additive metal carbide and/or additive metal boride, etc. More importantly, the preference of a parent metal versus an additive material to react with the permeable mass being reactively infiltrated is dependent upon a number of factors including the relative reactivities of the respective metals with the constituents of the permeable mass under the process conditions selected (e.g., when an alloy comprising zirconium and chromium is reactively infiltrated into a permeable mass comprising boron carbide, the zirconium constituent of the alloy typically has a greater affinity or is more reactive with the boron carbide than the chromium or additive material constituent). Further, it has been observed that a zirconium alloy containing from about 0.5 to about 10 weight percent of an additive metal comprising niobium, preferably, about 1–5 weight percent niobium, can produce a self-supporting body which displays a reduction in grain size relative to a body produced without any significant amounts of niobium being present. Particularly, the additive metal (e.g., niobium, titanium, etc.) may be present in the ceramic and/or metallic phases of the formed composite. Therefore, the presence of additive metals comprising aluminum, silicon, chromium, niobium, etc., in a formed self-supporting body may result in a body which has superior mechanical, physical and thermal properties (e.g., enhanced high temperature strength, oxidation resistance, corrosion resistance, etc. Moreover, additive metals comprising nickel, cobalt, and alloys thereof may provide enhanced creep resistance properties to the formed composite body relative to similarly produced bodies which do not contain these additives.

It should be understood that even though the additives discussed above have been referred to by their "pure" chemical formulae, some levels or amounts of impurities may be acceptable, so long as the impurities do not interfere significantly with the processes of the invention or contribute undesirable by-products to the finished composite material.

Moreover, particular emphasis is placed upon modifying the properties of a composite body which is produced by reactively infiltrating a mass containing boron carbide with a zirconium parent metal (hereinafter sometimes referred to as a "ZBC composite body"). However, the methods disclosed herein are believed to be generic for a number of different parent metals (e.g., titanium, zirconium, tantalum, hafnium, etc.) which may be reactively infiltrated into (1) a mixture of boron carbide and a boron donor material and/or a carbon donor material and (2) a mixture of a boron donor material and a carbon donor material.

DEFINITIONS

As used in this specification and the appended claims, the terms below are defined as follows:

"Parent metal" refers to that metal, e.g. zirconium, titanium, hafnium, etc., which is the precursor to the polycrystalline oxidation reaction product, that is, the parent metal boride, parent metal carbide, parent metal nitride, or other parent metal compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, titanium, hafnium, etc., the metal identified should be read with this definition in mind unless indicated otherwise by the context.

"Parent metal boride" and "parent metal boro compounds" mean a reaction product containing boron formed upon reaction between a boron donor material, such as boron carbide or boron nitride, and the parent metal and includes a binary compound of boron with the parent metal as well as ternary or higher order compounds.

"Parent metal nitride" means a reaction product containing nitrogen formed upon reaction of a nitrogen donor material, such as boron nitride and the parent metal.

"Parent metal carbide" means a reaction product containing carbon formed upon reaction of a carbon donor material, such as boron carbide, and the parent metal.

DETAILED DESCRIPTION OF THE INVENTION AND PREFERRED EMBODIMENTS

Figure 1:
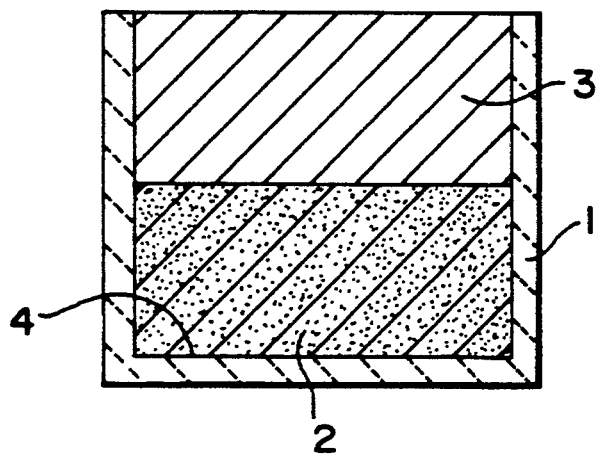
FIG. 1 is a schematic elevational view in cross-section showing a modified $B_4C$ preform 2 in contact with an ingot of zirconium parent metal 3, both of which are contained within a refractory vessel 1.

The present invention relates to methods for modifying the mechanical properties of a composite body which is produced by the reactive infiltration of a parent metal into a permeable mass containing, for example, (1) boron carbide or (2) boron carbide and a boron donor material and/or a carbon donor material or (3) a boron donor material and a carbon donor material. Particularly, by communicating at least one additive material with a boron and carbon-containing naterlal (e.g., $B_4C$) and/or with a parent metal at least at some polnt during the process, mechanical properties such as hardness, modulus of elasticity, density, porosity, and grain size may be adjusted advantageously. As disclosed in the '433 Series, a baron carbide preform can be prepared by any of a wide range of conventional ceramic body formation methods, including uniaxial pressing, isostatic pressing, slip casting, sedimentatlon casting, tape casting, injection molding, filament winding for fibrous materials, etc. Additionally, It is disclosed that an initial bonding of the material comprising the preform, prior to reactive infiltration, may occur by such processes as light sintering of the materials, or by use of various organic or inorganic binder materials which do not significantly Interfere with the process or contribute undesirable by-products to the finished material. It has been discovered that by, (1) combining at least one additive material with the boron and/or carbon containing material, (2) mixing or alloying at least one additive material wlth the parent metal, (3) placing at least one additive material at an interface between the parent metal and the mass of filler material or preform, (4) or any combination of these methods, can result in a potentially desirable modification of the properties of the resultant composite body. For example, additive materials such as TaC, ZrC, SiC, $ZrB_2$, VC, NbC, WC, $W_2B_5$ and/or $Mo_2B_5$ can be combined with the boron and/or carbon containing material (e.g. boron carbide) and can be shaped or formed to result in a prefom which has sufficient shape integrity and green strength; is permeable to the transport of molten metal; preferably has a porosity of between about 5-90 percent by volume, and more preferably has a porosity between about 25-75 percent by volume. Further, an additive material may comprise at least one of the following refractory oxides: alumina ($Al_2O_3$), magnesia (MgO), spinel ($MgAl_2O_4$), yttria ($Y_2O_3$), lanthanum oxide ($La_2O_3$), calcium oxide (CaO), hafnium oxide ($HfO_2$), ytterbium oxide ($Yb_2O_3$), zirconium ($ZrSiO_4$) borides of silicon (e.g., $SiB_6$, $SiB_4$), etc. Further still, additive materials comprising refractory oxides such as $ZrO_2$, stabilized $ZrO_2$, etc., may be admixed with the boron and/or carbon-containing material to form the permeable mass to be reactively infiltrated in order to enhance the creep-resistance of the formed composite body.

In one embodiment of the invention, the ratio of parent metal-boride to parent metal-carbide within the formed composite may be altered or controlled by utilizing an additive material comprising reducible metal borides or reducible metal carbides in addition to a mass comprising boron carbide. Specifically, one or more reducible additive compounds such as $SiB_6$, SiC, $Mo_2B_5$, $W_2B_5$, $TaB_2$, etc., can be provided by, for example, admixing powders of the reducible additive compounds with the boron and/or carbon containing powders (e.g. $B_4C$) to produce the permeable mass which is to be contacted with molten parent metal. The molten parent metal may react with the carbon and/or boron constituent of the reducible compound(s) to form a parent metal boride or carbide which can liberate elemental reduced metal (e.g., Mo, W, etc.). The liberated metal may alloy with residual parent metal, form an intermetallic compound with the parent metal, be present as an unreacted or elemental phase within the formed composite, etc.

Moreover, metallic additive materials such as Al, Nb, Ni, Ti, Hf, Si, V, Ta, Co, Cr, Mo, W and alloys thereof, etc., can be communicated with, at least at some point during the process, at least one of the parent metal and/or some portion of the permeable mass which is to be reactively infiltrated. For example, an additive metal comprising niobium may be alloyed with, for example, a zirconium parent metal in an amount of 0.5-10 percent by weight, and preferably, 1-5 percent by weight. Further, depending upon the process conditions (e.g., temperature) and the reactive infiltration system (i.e., combination of parent metal, permeable mass, atmosphere, etc.), a metal such as titanium can serve as both a parent metal and an additive (e.g., a zirconium parent metal may reactively infiltrate into a permeable mass (e.g., a preform) comprising a mixture of boron carbide and titanium (i.e., wherein titanium functions as an additive material), whereas under differing process conditions titanium may function as a parent metal and reactively infiltrate into a permeable mass comprising boron carbide). The relative quantity of the particular metal present may also affect which metal functions primarily as the parent metal (e.g., a metal having the greater quantity corresponds to the parent metal as defined herein). However, the additive may also react with the permeable mass to form additive carbide and/or additive boride phases. For example, an additive metal (e.g., niobium, titanium, etc.) may be present in the ceramic and/or metallic phase of the formed composite.

Moreover, other materials, such as, for example titanium diboride and aluminum dodecaboride, may also be included in the permeable mass which is to be reactively infiltrated. These materials, under certain processing conditions, may function as filler materials, so long as they do not adversely impact resultant mechanical properties of the composite body or the formation of the composite body.

An additive material may be admixed with a filler material to form a permeable mass (e.g., a preform). However, in most cases, the additive material should be relatively more reactive in comparison to the filler material. Particularly, the characteristics of an additive material in a specific reactive infiltration system are distinct from those of a filler material. For example, an additive material (e.g., niobium) may be capable of altering the morphology of the microstructure (e.g., achieving a smaller or refined microstructure) of a body formed by reactive infiltration. Further, an additive material (e.g., a refractory oxide) may be capable of increasing the creep resistance of a body formed by reactive infiltration (e.g., a refractory oxide may tend to pin or lock together phases within the formed body). Further still, an additive material may function as a nucleation site for precipitation of the products (e.g., $ZrB_2$) formed by reactive infiltration. In contrast, a filler material tends to be relatively inert during the reactive infiltration process. Moreover, the ability of a material to function as an additive material or filler material is dependent upon the processing conditions (e.g., temperature) and particular reactive infiltration system (e.g., parent metal, atmosphere, other constituents in the permeable mass, etc.). Therefore, upon proper selection of additive materials and processing conditions, the present invention permits modifying or tailoring the characteristics of a body formed by reactive infiltration.

Further, an additive material (e.g., $SiB_6$) may react to form one or more phases (e.g., $SiO_2$) which renders at least the portion of the formed composite body more oxidation resistant. Specifically, an additive material comprising silicon hexaboride may react upon exposure to an oxygen-containing environment at an elevated temperature to form an oxidation resistant layer comprising silicon (e.g., amorphous $SiO_2$) upon at least a portion of a surface region of the formed body (e.g., a ZBC body formed by reactive infiltration can be formed so as to contain a surface layer, at least a portion of which comprises $SiO_2$).

Further still, it is possible that the additive material may be incorporated within a phase or phases (e.g., ZrC, $ZrB_2$, etc.) and/or between grain boundaries, which were formed during reactive infiltration (e.g., a particle of ZrC at least partially incorporated within a phase comprising ZrC which has formed by reactive infiltration). Without wishing to be bound by any specific theory or explanation, it is possible that when the additive material is present between grain boundaries, the additive material may function to lock or pin together adjacent phases and therefore, enhance high temperature creep performance. Moreover, the additive material may function to modify the morphology of the formed composite (e.g., by achieving a refined microstructure, precipitated phases, etc.).

Figure 3:
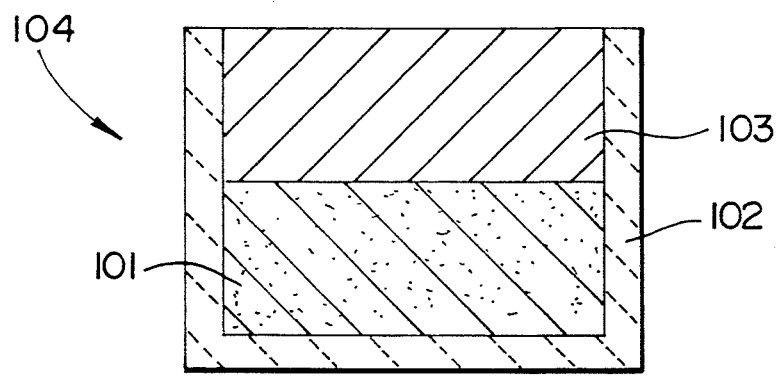
FIG. 3 is a schematic elevational view in cross-section showing a $B_4C$ material 101 in contact with a parent metal 103, both of which are contained within a graphite crucible 102.

By following the general processing procedures set forth in the '433 Series, and by utilizing a setup in accordance with, for example, FIG. 3 herein, it has been discovered that properties of a composite body can be modified by communicating an appropriate additive material (e.g., Nb, TaC, $SiB_6$, etc.) with the parent metal and/or permeable mass (e.g., boron carbide) at least at some point during the process. For example, boron carbide combined with an appropriate additive material, which, optionally, may be further combined with any desired inert filler materials, can be fabricated into a preform with a shape corresponding to an approximate desired geometry of the final composite. For example, as shown in FIG. 3, a mass comprising boron carbide 101, is located within a graphite crucible 102, with a parent metal 103, in contact therewith. Additionally, the boron carbide material 101, may comprise a loose bed of boron carbide or may be formed into a preform which can be prepared by any of a wide range of ceramic body formation methods (e.g., uniaxial pressing, isostatic pressing, slip casting, sedimentation casting, tape casting, injection molding, spray coating, tapping, dipping, extruding, filament winding for fibrous material, etc.) depending on the specific characteristics of the filler. Initial bonding of the permeable mass prior to achieving a reactive infiltration into the permeable mass, may be obtained through light sintering or by use of various organic or inorganic binder materials which do not significantly interfere with the reactive infiltration process or contribute undesirable by-products to the finished material. The preform may be manufactured to have sufficient shape integrity and green strength, and should be permeable to the transport of molten metal, and preferably have a porosity of between about 5 and 90 percent by volume and more preferably about 25-75 percent by volume. Moreover, suitable filler materials for use in the permeable mass may includer for example, titanium diboride, aluminum dodecaboride, etc., provided that these materials are relatively inert under the process conditions (e.g., certain filler materials may be induced to function as an additive material if the reactive infiltration process conditions are appropriately altered). Suitable particulates for use as fillers in the permeable mass typically have a mesh size of from about 14 to about 1000, but any suitable mixture of filler materials and mesh sizes may be used. The boron carbide material 101, is then contacted with molten parent metal, on one or more of its surfaces, for a time sufficient to complete reactive infiltration to the surface boundaries of the boron carbide material 101. The result of this process is a ceramic-metal composite body of a shape closely or substantially exactly duplicating the shape of the boron carbide material 101, thus minimizing or eliminating the expense of final machining or grinding operations.

It has been discovered that by admixing about 5-50 percent by weight of an additive material (e.g., TaC, ZrC, or $ZrB_2$, etc.) having a purity level of at least about 99%, with a boron source material and a carbon source material (e.g., boron carbide) and a suitable binder material, such as an organic or an inorganic binder, and forming a preform in accordance with the methods set forth in Patent '130, and thereafter reactively infiltrating a molten parent metal into the preform, the amount of porosity in a resultant composite body, relative to a composite body which does not utilize the aforementioned additive materials, is reduced.

Moreover, by cormnunicating at least one of the metallic additive materials (e.g., Ti, Si, Al, Cr, Nb, etc.) with the parent metal and/or the permeable mass, by any of the methods discussed above, at least one property of a formed composite body can be modified relative to a composite body which does not include such an additive. For example, if the parent metal comprises a zirconium metal, a metallic additive material such as niobium could be alloyed with the zirconium parent metal. The zirconium-niobium alloy could then be contacted with, for example, a boron carbide material which could be shaped or formed into a preform, or could be a loose mass or bed of particulate. When the zirconium niobium alloy is made molten in the presence of a substantially inert environment, the molten metal reactively infiltrates the boron carbide mass to form at least one reaction product. For example, the boron carbide can be decomposed or reduced, at least in part, by the molten zirconium parent metal, thereby forming, for example, a zirconium diboride compound. Additionally, a zirconium carbide may also be produced. Moreover, in some cases a zirconium-boron compound may also be produced. As initial reaction product is formed by reactive infiltration, at least a portion of the formed reaction product is maintained in contact with the zirconium parent metal, and additional molten parent metal is drawn or transported through unreacted boron carbide by a wicking or a capillary action. The transported zirconium metal forms additional zirconium metal boride (e.g., zirconium diboride), zirconium metal carbide (e.g., zirconium carbide) and/or zirconium metal boro carbide and the formation or development of a ceramic body is continued until either the zirconium metal or boron carbide has been consumed, or until the reaction temperature is altered to be outside of the reaction temperature envelope. Preferably, conversion of the boron carbide to the parent metal boride and/or parent metal carbide and optionally parent metal boro carbide is at least about 50 percent, and most preferably at least about 90%. In certain situations, it may be desirable to obtain substantially complete reaction of the boron carbide, which can be achieved by the techniques of the present invention.

Moreover, the presence of an additive material comprising niobium when alloyed into the zirconium parent metal, particularly when the weight percent of niobium in the zirconium alloy is about 1-5 weight percent, may result in a self-supporting body which displays a reduction in grain size relative to a self-supporting body produced by utilizing a zirconium parent metal having little or no niobium present. In addition, it has been observed that the relative amount of zirconium metal that infiltrates into a permeable mass comprising a boron source material and a carbon source material (e.g., boron carbide) can be enhanced, and/or the rate of infiltration can be increased, thus resulting in a substantially low (e.g., less than 5 volume percent) residual metal content in the as-grown or as-formed self-supporting body (e.g., the niobium constituent of the alloy may increase the fluidity of the zirconium). The reduction in grain size and/or volume percent of residual metal present in the self-supporting composite bodies which may be formed according to one aspect of the invention, can result in platelet reinforced bodies which demonstrate improved high temperature performance in such areas as strength, oxidation resistance and corrosion resistance, in comparison to similar bodies made without utilizing niobium alloyed with the zirconium parent metal. Without wishing to be bound by any specific theory or explanation, it is believed that niobium may be present in the formed ceramic and/or the residual metallic constituent, which exists between platelets of zirconium diboride and/or between particles of zirconium carbide. Particularly, when such niobium is present in the residual metallic constituent contained within the self-supporting composite body, the residual metallic constituent may exhibit better mechanical properties relative to a similar body which contains residual metallic constituent without niobium. The amount of niobium in the residual metallic constituent may be from about ½ percent to about 25 percent by weight and a preferable range may be about 2-5 percent by weight. Additionally, a refinement in grain size of the formed microstructure may be achieved by utilizing an additive such as niobium in combination with a parent metal such as zirconium.

Further, niobium, as well as other suitable additive materials, may be provided as at least one alloying constituent, within the permeable mass to be reactively infiltrated, as well as at the interface between the parent metal and the permeable mass to be reactively infiltrated. Further still, an additive material (e.g., TaC, SiB$_6$, MgO, etc.) may be admixed with at least one other additive materials such as additive metal materials (e.g., Nb, Co, Ni, V, etc.) and at least one filler material to form the permeable mass which is to be reactively infiltrated. For example, a permeable mass comprising boron carbide, a filler material, an additive material (e.g., TaC), and an additive metal (e.g., Si) may be reactively infiltrated with a zirconium parent metal alloy which contains niobium.

The following are examples of various aspects of the present invention. These examples are intended only to be illustrative of preferred embodiments of the present invention which are directed to utilizing various additive materials and are not intended to limit the scope of the invention.

EXAMPLES 1-3

A preform of boron carbide measuring about 1-inch (25 mm) in diameter and about ⅜-inch (9.5 mm) thick was made by admixing about 85 percent by weight B$_4$C (1000 grit from ESK), about 5 percent by weight organic binder (Acrawax-C from Lonza, Inc.) and about 10 percent by weight TaC (from Atlantic Equipment Engineers). The admixture was placed in a steel die and dry pressed at a pressure of about 2000 psi (14 MPa). As shown in FIG. 1, the preform 2 was placed in a bottom portion of a graphite refractory vessel 1 (made from Grade ATJ graphite from Union Carbide) and placed in contact with an ingot of zirconium parent metal 2 (Grade 702 Zr alloy from Teledyne Wah Chang Albany). The graphite refractory vessel, together with its contents, was placed in a controlled atmosphere-resistance heated furnace. The atmosphere in the furnace was argon, the argon being from Matheson Gas Products, Inc. The furnace was first evacuated at room temperature to a pressure of about $1 \times 10^{-2}$ Torr (1.3 Pa) and thereafter backfilled with argon. The furnace was then evacuated to a pressure of about $1 \times 10^{-2}$ Torr (1.3 Pa) and thereafter heated from about room temperature to a temperature of about 250° C. over a period of about 30 minutes. The furnace was thereafter heated from about 250° C. to about 460° C., at a rate of 100° C. per hour. The furnace was again backfilled with argon which remained flowing at a rate of about 0.5 liter per minute and was maintained at a pressure of about 2 psi (14 kPa). The furnace was heated to a temperature of about 1950° C. for about two-hours and then held at about 1950° C. for about two hours. The furnace was then cooled for about five hours. After cooling, the formed composite was removed from the furnace.

The resulting composite body was examined, and it was discovered that the amount of porosity in the bottom one-fourth of the composite body (i.e., the portion of the body which was initially the most distant from the ingot of parent metal) had been reduced relative to the amount of porosity in composites produced by an identical method (i.e., all steps were identical, except for the presence of TaC in the preform). Stated in greater detail, the composite bodies produced without incorporating TaC into the preform typically exhibited a substantial amount of porosity at an interface 4 between the bottom surface of the preform 2 and the refractory vessel 1. However, such porosity was substantially completely eliminated by practicing the methods according to the present invention.

The procedures set forth above were followed substantially exactly for Examples 2 and 3, except that rather than utilizing TaC as an additive, ZrC and ZrB$_2$ were used as additives, respectively, to the boron carbide preform. Particularly, each of ZrC and ZrB$_2$ (also obtained from Atlantic Equipment Engineers) was individually added to the boron carbide material forming the preform in an amount which was about 10 percent by weight. After following the processing steps set forth in Example 1 above, it was observed that the porosity in the resultant composite bodies was substantially completely eliminated.

A second aspect of the present invention relates to substantially completely eliminating the porosity which occurs at an interface between a boron carbide preform and a graphite refractory vessel by using a different parent metal zirconium alloy than that used in the above examples and that used in the '433 Series. Particularly, the above examples and the '433 Series disclose the use of a commercially available Grade 702 zirconium alloy. However, it has been unexpectedly discovered that in some cases, the use of the Grade 702 alloy may be detrimental to the resultant composite body because the Grade 702 alloy contains about 0.1-0.2 weight percent tin (i.e., 1000-2000 ppm by weight tin). The presence of tin in these amounts has been discovered to be undesirable because it appears that as a boron carbide permeable mass is reactively infiltrated by the Grade 702 parent metal alloy, the zone of metal at the infiltration front becomes enriched in tin. This zone or layer of tin-rich metal accumulates at or adjacent to the interface which exists between the bottom of the permeable mass and the graphite refractory vessel (i.e., at or adjacent to the interface 4 in FIG. 1). It appears that this layer of tin volatilizes at the interface 4, resulting in porosity In the composite body. This problem can be ameliorated by utlllzing a zirconium sponge parent metal containing less than 1000 ppm by weight tin, preforably less than 500 ppm by weight tin. Thus, by utilizing a parent metal of zirconium sponge from Teledyne Wah Chang Albany, having a tin content of about 200 ppm, the amount of porosity produced at the interface 4 is substantially completely eliminated. Thus, the added costs of grinding or machining can be eliminated.

The following is an example of the second aspect of the present Invention. The example is intended to be illustrative of various aspects of the effect of utilizing a zirconium sponge parent metal for reactively infiltrating a boron carbide preform.

EXAMPLE 4

A boron carbide preform was manufactured according to the steps set forth in Examples 1-3. However, the composition of the preform was about 95 percent by weight boron carblde and about 5 percent by weight organic binder (Acrawax C from Lonza, Inc.).

Figure 2:
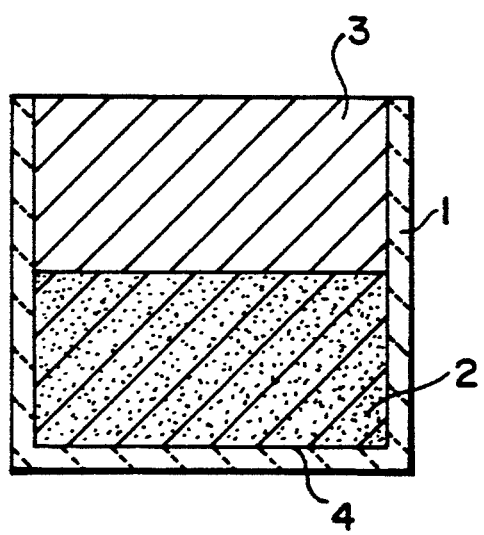
FIG. 2 is a schematic elevational view in cross-section showing a $B_4C$ preform 2 in contact with a zirconium sponge parent metal 3, both of which are contained within a refractory vessel 1.

As shown in FIG. 2, the boron carbide preform 2 was placed in a bottom portion of a graphite refractory vessel 1 and the boron carbide preform 2 was placed in contact wlth a zirconium sponge parent metal 3. The graphite refractory vessel, together with its contents, was placed in a closed atmosphere-resistance heating furnace. The atmosphere in the furnace was argon, the argon being from Matheson Gas Products, Inc. The furnace was first evacuated at room temperature to a pressure of about $1 \times 10^{-2}$ Torr (1.3 Pa) and thereafter backfilled with argon. The furnace was then evacuated to a pressure of about $1 \times 10^{-2}$ Torr (1.3 Pa) and thereafter heated from about room temperature to a temperature of about 250° C. over a period of about 30 mlnutes. The furnace was thereafter heated from about 250° C. to about 450° C., at a rate of 100° C. per hour. The furnace was agaln backfilled with argon which remained flowing at a rate of about 0.5 liter per minute and was maintained at a pressure of about 2 psi (14 kPa). The furnace was heated to a temperature of about 1950° C. ever a two-hour period and then held at about 1950° C. for about two hours. The furnace was then cooled for about five hours. After cooling, the formed composite was removed from the furnace.

The resulting composite body was examined, add it was discovered that the amount of porosity In the composite body had been reduced relative to the amount of porosity in composites produced by an identical method, except for the use of a Grade 702 zirconium alloy. Stated in greater detail, the composite bodies produced by using a Grade 702 zirconium alloy typically exhibited a substantial amount of porosity at the interface between the preform 2 and refractory vessel 1 at the interface designated 4. However, such porosity was substantially completely eliminated by utillzlng a zirconium sponge parent metal having a relatively low tin content.

EXAMPLE 5

FIG. 3 shows a setup in cross-section which was used to form a platelet reinforced composite by reactive infiltration in accordance with is the present invention. In order to create a preform 101, about 90 grams of a slurry comprising about 39.8 wt % 1000 grit B4C (MIO from ESK Company), 59.8 wt % methylene chloride (from J. T. Baker) and 0.4 wt % of a binder XUS 40303.00 from Dow Chemical Company was mixed and then poured into a 2 inch (51 mm) by 2 inch (51 mm) by 3 inch (76 mm) graphite mold 102 (ATJ from Union Carbide). The solvent was evaporated from the preform 101 at room temperature in approximately 18-24 hours in a vented drying box. After the evaporation step, the prefore 101 had approximate dimensions of about 2 inches (51 mm) by 2 inches (11 mm) by ½ inch (13 mm).

The binder was removed from the preform 101 by placlng the graphite mold 102 containing the preform 101 into a vacuum furnace, evacuating the furnace to approximately $2 \times 10^{-4}$ torr (0.027 Pa) and backfilllng at room temperature with argon to approximately 2 psi (14 kPa) pressure. At this point, the furnace was again evacuated to a low vacuum (approximately $1 \times 10^{-1}$ torr (13 Pa)) and then backfilled with argon at a gas flow rate of approximately 1000 cc per minute until the pressure within the furnace was approximately 2 psi (14 kPa). After this second evacuation and backfilling step, the furnace was again evacuated to a low vacuum (approximately $1 \times 10^{-1}$ torr (13 Pa)) and backfilled with argon at room temperature to approximately 2 psi (14 kPa). These multiple evacuation and backfilling steps were performed to ensure a substantially pure argon atmosphere within the furnace. After the third evacuation and backfilling step was completed, a continuous argon gas flow rate of approximately 1000 cc per minute and a furnace pressure of about 2 psi (14 kPa) was maintained in the furnace. The furnace temperature was then ramped from room temperature to about 350° C. in 2.5 hours, then ramped from about 350° to about 450° C. at about 10° C. per hour, then from about 450° to about 600° C. in about 3 hours, then held at about 600° C. for about 1 hour. The setup was ramped down to about room temperature in approximately 2 hours. After reaching room temperature, the graphite mold 102 containing the preform 101 was removed from the furnace.

An approximately 219.60 gram ingot 103 of comercially available Zircadyne 705 zirconium allay, which contained niobium as an alloying constituent, was obtained from Teledyne Wah Chang of Albany, Ore., and having dimensions of about 1.98 inch (50 mm) by 1.98 inch (50 mm) by ½ inch (13 mm) was placed on top of the preform 101 contained within the graphite mold 102. The setup 104, consisting of the graphite mold 102 and its contents, was placed into a vacuum furnace at room temperature. The furnace was then evacuated to approximately $2\times10^{-4}$ torr (0.027 Pa) and backfilled at room temperature with argon until the pressure within the furnace was approximately 2 psi (14 kPa). At this point, the furnace was again evacuated to approximately $2\times10^{-4}$ torr (0.027 Pa) and then backfilled with argon until the pressure within the furnace was approximately 2 psi (14 kPa). This second evacuation and backfilling step was performed to ensure a pure argon atmosphere within the furnace.

Figure 4:
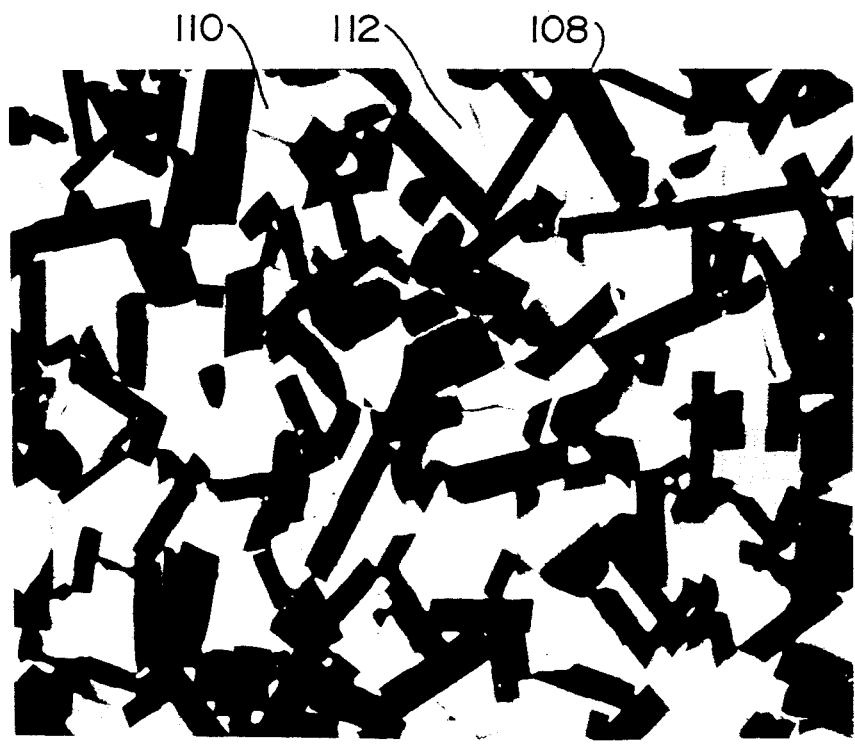
FIG. 4 is a photomicrograph taken at about 1000× of a microstructure of a sample produced in accordance with Example 5.
Figure 5:
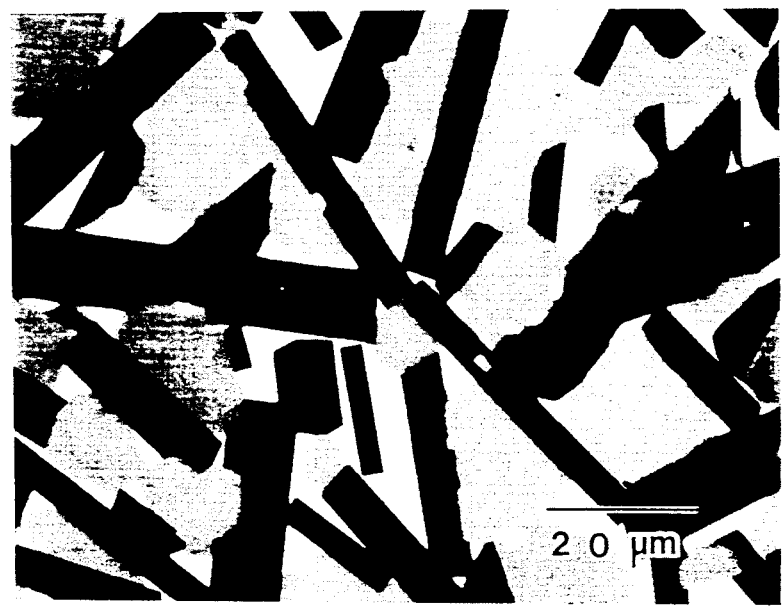
FIG. 5 is a photomicrograph taken at about 1000× of a microstructure of a comparative sample produced in accordance with FIG. 1 of U.S. Pat. No. 4,885,130 (i.e., no niobium was included)

After the second backfilling step, the argon gas flow rate to the furnace was maintained at approximately 2 liters/minute and the furnace pressure was maintained at approximately 2 psi (14 kPa). The furnace temperature was then ramped to about 1950° C. in about 5 hours. The furnace temperature was maintained at about 1950° C. for about 2 hours and then ramped down to room temperature in about 8 hours. After reaching room temperature, the setup 104 was removed from the furnace and disassembled. A platelet reinforced composite comprising zirconium diboride, zirconium carbide, and the niobium containing zirconium alloy, was recovered. FIG. 4 is a photomicrograph taken at about $1000\times$ of the platelet reinforced composite produced in the present example. As shown in FIG. 4, the zirconium diboride phase is labelled 108, the zirconium carbide phase is labelled 110, and the residual niobium-containing zirconium alloy is labelled 112. FIG. 5 is a photomicrograph taken at about $1000\times$ of a platelet reinforced composite produced by a method which is substantially similar to the method used to produce the composite shown in FIG. 4 (i.e., produced in accordance with Example 1 in Patent '130). Thus, the composite shown in FIG. 5 was produced from a zirconium ingot which contained substantially no niobium. A comparison of the composite microstructures shown in FIGS. 4 and 5 demonstrates that the composite shown in FIG. 4 has a finer microstructure and less residual zirconium parent metal than the composite shown in FIG. 5.

Accordingly, this Example demonstrates that it is possible to refine the microstructure of a platelet reinforced zirconium composite by utilizing a zirconium alloy as the parent metal which contains niobium as an additive material.

EXAMPLE 6

Example 6 was carried out with a setup as shown in FIG. 3 to form a platelet reinforced composite by reactive infiltration in accordance with the method of the present Invention. In order to create the preform, approximately 77 grams of a slurry comprising about 39.8% by weight B$_4$C (lot M10, from ESK Company), 59.8% by weight of methylene chloride (from J. T. Baker), and about 0.4% by weight of a binder XUS 40303.00 from Dow Chemical Company was mixed and then poured into a 2 inch (51 mm) by 2 inch (51 mm) by 3 inch (76 mm) graphite mold (ATJ from Union Carbide). The solvent was evaporated from the preform by placing the graphite mold and its contents in a vented drying box at room temperature for approximately 18-24 hours. After the evaporation step, the preform had approximate dimensions of about 2 inches (51 mm) by 2 inches (51 mm) by ½ inch (13 mm).

The binder was removed from the preform by placing the graphite mold containing the preform into a vacuum furnace, evacuating the furnace to a low vacuum (approximately $1\times10^{-1}$ torr (13 Pa)) and backfilling at room temperature with argon to approximately 2 psi (14 kPa). At this point, the furnace was again evacuated to approximately $1\times10^{-1}$ torr (13 Pa) and then backfilled with argon at room temperature to approximately 2 psi (14 kPa). After this second evacuation and backfilling step, tha furnace was again evacuated to approximately $1\times10^{-1}$ torr (13 Pa) and backfilled with argon at room temperature to approximately 2 psi (14 kPa). These multiple evacuation and backfilling steps were performed to ensure a substantially pure argon atmosphere within the furnace. After the third evacuation and backfilling step was completed, a continuous argon gas flow rate of approximately 1000 cc per minute and a furnace pressure of about 2 psi (14 kPa) w4s maintained in the furnace. The furnace temperature was then ramped from room temperature to about 3500° C. in about 2.5 hours, held at about 350° C. for about 2 hours, and then heated from about 350° C. to about 450° C. at about 10° C. per hour. Upon reaching 450° C., the heating rate was changed and the furnace temperature was raised from about 450° C. to about 500° C. in three hours. The furnace temperature was held at about 600° C. for about three hours and then cooled to room temperature in about two hours. After reaching room temperature, the setup was removed from the furnace.

An approximately 218.84 gram ingot of commercially available Zircadyne 705 zirconium alloy, which contained niobium as an alloying constituent, was obtained from Teledyne Wah Chang of Albany, Ore., and having approximate dimensions of 2 inches (51 mm) by 2 inches (51 mm) by ½ inch (13 mm) was placed on top of the preform contained within the graphite mold. The setup, consisting of the graphite mold and its contents, was placed into a vacuum furnace at about room temperature. The furnace was then evacuated to approximately $2\times10^{-4}$ torr (0.027 Pa) and backfilled at room temperature with argon until the pressure within the furnace was approximately 2 psi (14 kPa). At this point, the furnace was again evacuated to approximately $2\times10^{-4}$ torr (0.027 Pa) for about one minute, and then to about $3.6\times10^{-4}$ torr (0.048 Pa). After this evacuation step, the furnace was backfilled with argon until the pressure in the furnace was approximately 2 psi (14 kPa). This second evacuation and backfilling step was performed to ensure a substantially pure argon atmosphere within the furnace. After this second backfilling step, the argon gas flow rate was maintained at approximately 2 liters/minute and the furnace pressure was maintained at approximately 2 psi (14 kPa). The furnace temperature was then ramped to approximately 1900° C. in about five hours. The system was maintained at about 1900° C. for about 10 minutes, then the temperature in the furnace was ramped down to room temperature in approximately 12 hours. After reaching room temperature, the setup was removed from the furnace and disassembled. A platelet reinforced composite, comprising zirconium diborides zirconium carbide and a metallic phase comprising zirconium and niobium was recovered.

Due to the shorter time permitted for reactive infiltration, the composite formed in Example 6 possessed a higher metal content than the composite formed In Example 5.

EXAMPLE 7

Example 7 was carried out wlth a setup as shown In FIG. 3 to form a platelet reinforced composite by reactive infiltration in accordance with the method of the present invention. In order to create the preform, about 90 grams of a slurry comprising about 40.0 weight percent of 1000 grit B$_4$C (lot M9 from ESK Company), about 59.6 weight percent of methylene is chloride (DCM from J. T, Baker) and about 0.4 weight percent of binder XUS 40303.00 from Dow Chemical Company was mixed and then poured into a 3 inch (76 mm) by 3 inch (76 mm) by 3 inch (76 mm) graphite mold (ATJ from Union Carbide). The solvent was removed from the preform by placing the graphite mold and its contents in a vented drying box at room temperature for approximately 18-24 hours. After the evaporation step, a preform had approximate dimensions of about 3 inches (76 mm) by 3 inch as (76 mm) by 0.5 inch (13 mm).

The binder was removed from the preform by placing the graphite mold containing the preform into a vacuum furnace, evacuating the furnace to a low vacuum (approximately $1.0 \times 10^{-1}$ torr (13 Pa)) and backfilling at room temperature with argon to approximately 2 psi (14 kPa). At this point, the furnace was again evacuated to approximately $1.0 \times 10^{-1}$ torr (13 Pa) and then backfilled with argon at room temperature to approximately 2 psi (14 kPa). The two evacuation and backfilling steps were performed to ensure a substantially pure argon atmosphere within the furnace. After the second evacuation and backfilling stop was completed, a continuous argon gas flow rate of approximately 2 liters/minute and a furnace pressure of about 2 psi (14 kPa) was maintained in the furnace. The furnace temperature was then ramped from room temperature to about 200° C. in about two hours, held at about 200° C. for about two hours, and then heated from about 200° to about 350° C. at about 20° C. per hour. Upon reaching 350° C., the heating rate was changed and the furnace temperature was raised from about 350° C. to about 450° C. in about two hours. After the furnace temperature reached 450° C., the setup was cooled to room temperature in approximately 12 hours. Upon reaching room temperature, the setup was removed from the furnace.

Figure 6:
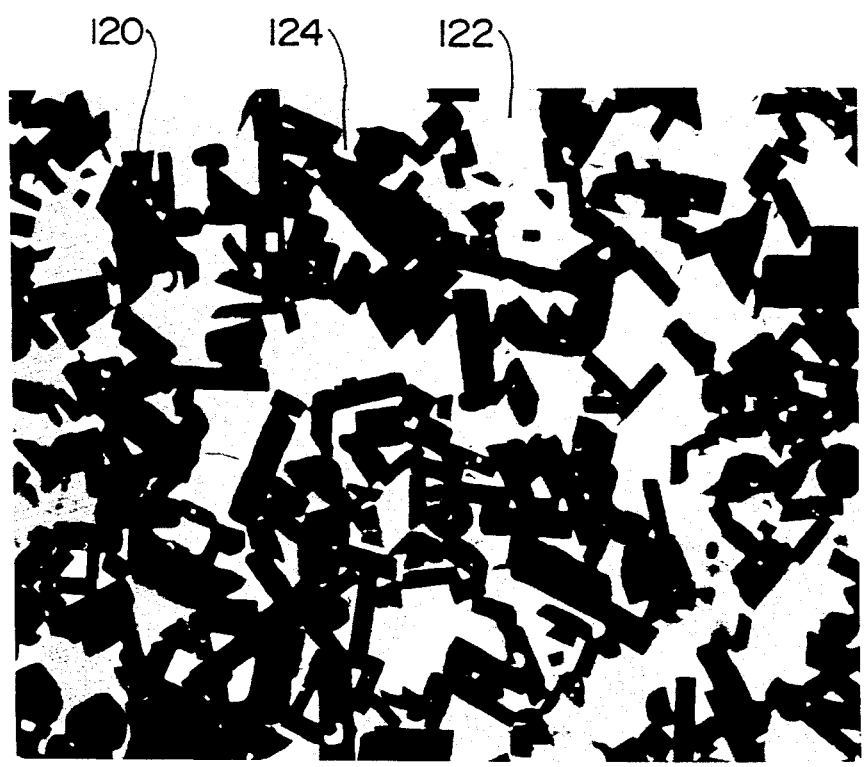
FIG. 6 is a photomicrograph taken at about 1000× of a microstructure of a sample produced in accordance with Example 7.

An approximately 581.69 gram ingot of comercially available Zircadyne 705 zirconium alloy, which contained niobium as an alloying constituent, was obtained from Teledyne Wah Chang of Albany, Ore., and having approximate dimensions of 3 inch (76 mm) by 3 inch (76 mm) by 0.5 inch (13 mm) was placed on top of the preform contained within the graphite mold. The setup, consisting of the graphite mold and its contents, was placed into a vacuum furnace at room temperature. The furnace was then evacuated to approximately $1 \times 10^{-4}$ torr (0.013 Pa). The system was heated from room temperature to about 1000° C. under vacuum in approximately 3 hours. The furnace was then backfilled with argon gas flowing at a rate of about 2 liters/minute, until the pressure within the furnace was approximately 2 psi (14 kPa). The furnace was then heated from about 1000° C. to about 1900° C. In approximately 3 hours and maintained at about 1900° C. to about 2000° C. for about two hours. After holding the furnace temperature in this range for about two hours, the furnace was ramped to room temperature in approximately 8 hours. Upon reaching room temperature, the setup was removed from the furnace and disassembled. A platelet reinforced composite comprising zirconium diboride, zirconium carbide and residual alloy comprising zirconium and niobium, was recovered. FIG. 6 is a photomicrograph taken at about 1000× of the platelet reinforced composite produced in the present example. As shown in FIG. 6, the zirconium diboride phase is labelled 120, the zirconium carbide phase is labelled 122, and the residual alloy comprising zirconium and niobium is labelled 124. As in Example 5, a comparison of the composite microstructures shown in FIGS. 5 and 6 demonstrates that the composite shown in FIG. 6 has a finer microstructure and less residual zirconium parent metal than the composite shown in FIG. 5.

EXAMPLE 8

This Example demonstrates that an additive material comprising niobium may be added to the permeable mass which is to be reactively infiltrated.

FIG. 3 shows a lay-up in cross-section which was utilized to form a composite in accordance with the present invention. About 28 grams of 1,000 grit B$_4$C (from ESK, lot number M9-C) and about 12 grams of 325 mesh niobium powder (Alfa Products, Morton Thiokol, lot number B24H) were mixed with about 60 grams of Methylene Chloride from (J. T. Baker) and about 0.4 grams of Dow experimental ceramic binder XUS40303.00. Specifically, the B$_4$C and niobium powders were dry milled on a ball-mill in a nalgene bottle for about 8 hours. A solution comprising the methylene chloride and Dow ceramic binder was then added to the mixture of B$_4$C and niobium powders to form a slurry. The nalgene bottle containing the slurry was placed onto the carriage of a Tyler Sieve Shaker and was vibrated for about a half an hour. The resultant slurry was sediment cast into a graphite mold measuring about 2" (51 mm)×2" (51 mm)×3" (76 mm) (supplied by ATJ). The graphite crucible containing the slurry was placed into a plastic bag and permitted to dry overnight. The graphite crucible was removed from the plastic bag and placed in an oven to dry for about one hour at 45° C. and at 70° C. for about two hours. The resultant preform weighed about 313 grams and measured about 2" (51 mm)×2" (51 mm)×0.35" (9 mm) in thickness.

The binder was removed from the preform by placing the graphite crucible containing the preform into a vacuum furnace. The furnace was twice evacuated and backfilled with argon. During the subsequent heating steps, argon was passed through the furnace at a rate of about two liters per minute. The temperature of the furnace was raised from room temperature to about 350° C. at a rate of about 100° C. per hour. The temperature was increased to about 450° C. at a rate of about 50° C. per hour. The temperature was increased to about 725° C. at a rate of approximately 100° C. per hour. This temperature was maintained for about one hour. The furnace was cooled to room temperature. After reaching room temperature, the graphite mold containing the preform was removed from the furnace.

A zirconium sponge weighing about 171 grams supplied by Western Zirconium Co., nuclear grade lot 4825, was placed upon the preform contained within the ATJ graphite mold. The lay-up consisting of the graphite mold and its contents was placed into a vacuum furnace at room temperature. The furnace was evacuated and backfilled with argon. The temperature of the furnace was raised from room temperature to about 1000° C. at a rate of approximately 190° C. per hour while under a vacuum. The temperature of the furnace was increased to about 1900° C. at a rate of approximately 190° C. per hour. During the second heating step, argon was passed through the furnace at a rate of about two liters per minute which supplied a chamber or gage pressure of about two (2) psig (0.14 kg/cm$^2$). The temperature of about 1900° C. was maintained for about two hours. The temperature of the furnace was cooled to room temperature at a rate of about 160° C. per hour. After reaching room temperature, the lay-up was removed from the furnace and disassembled. It was discovered that the zirconium metal had reacted with the preform to form a composite comprising zirconium diboride, zirconium carbide and zirconium metal.

Figure 7:
FIGS. 7 and 8 are photomicrographs taken at about 400× and 1000× magnification, respectively, of sections of composite bodies formed in accordance with Examples 8 and 9.

FIG. 7 is a photomicrograph of a section at 400× magnification of the composite produced in accordance with this Example.

The flexural strength of three specimens formed in accordance with this Example was tested. The samples measured about 6.05 millimeters in width and about 3.06 millimeters in depth. The particular specimen to be tested was placed upon the lower span of a four-point bending apparatus which measured about 40.06 millimeters. The upper span of the four-point bending apparatus, which measured about 19.93 millimeters, was brought into contact with the specimen to be tested in order to apply the testing load or force, which was about 5000 pounds. The load was applied at a rate of about 0.51 millimeter per minute. The mean flexural strength for the samples tested was about 670 MPa. The flexural strength of two specimens at about 1000° C. was tested utilizing the above-described testing conditions. The mean flexural strength for the two specimens was about 330 MPa. The fracture toughness of two specimens formed in accordance with this Example was tested utilizing the same conditions as discussed above in the flexural test. The two specimens measured about 4.855 millimeters in width and about 6.02 millimeters in depth. The samples were notched, placed upon the lower span of the four-point bending apparatus and the testing load was applied. The mean fracture toughness for the specimens tested was about 13 MPa.m$^{\frac{1}{2}}$. The fracture toughness for two samples formed in accordance with this Example was tested at about 1,000° C. The specimens tested measured about 4.83 millimaters in width and about 6.115 millimeters in depth. The samples to be tested were placed upon the lower span of the four-point bending apparatus and processed in the manner discussed above. The mean fracture toughness for the samples tested at about 1,000° C. was about 15 mPa.m$^{\frac{1}{2}}$. Further, the Young's Modulus for bodies formed in accordance with this Example was calculated to be in the range from about 417 GPa through about 420 GPa.

EXAMPLE 9

This Example demonstrates that an additive material comprising is titanium may be added to the permeable mass to be reactively infiltrated.

This Example was conducted substantially in accordance with Example 8 with the exception that about 7.12 grams of −325 mesh titanium metal (substantially all particle diameters smaller than about 45 μm) supplied by Chemalloy Co. was utilized instead of the niobium powder, A slurry comprising about 60 grams of methylene chloride, 0.4 grams of Dow Experimental Ceramic Binder XUS 40303.00, about 7 grams of titanium powder, and about 33 grams of 1000 grit (average particle diameter of about 5 μm) B$_4$C powder supplied by ESX Co. was sediment cast into a 2 inch (51 mm) square ATJ graphite crucible. The binder was removed and a zirconium sponge from Western Zirconium Co. (nuclear grade lot 4825) which weighed about 200 grams was placed upon the sediment cast preform in the ATJ graphite crucible. The crucible was placed into a vacuum furnace and evacuated twice with argon and heated substantially in accordance with Example 8. After heating and cooling to room temperature, the lay-up was removed from the furnace and disassembled. A platelet reinforced composite comprising zirconium diboride, zirconium carbide and a metal phase including zirconium and titanium was recovered.

Figure 8:

FIG. 8 is a microphotograph taken at about 1000× magnification of a section formed in accordance with this Example.

The mechanical properties of three specimens formed in accordance with this Example were tested utilizing the procedures discussed in Example 8. The mean room temperature flexural strength was about 925 MPa. The 1000° C. flexural test for two samples provided a mean flexural strength of about 330 MPa. The fracture toughness for two samples, which were formed in accordance with this Example provided a mean fracture toughness of about 17 MPa*m$^{\frac{1}{2}}$. The fracture toughness at about 1,000° C. for two samples provided a mean of about 14 MPa*m$^{\frac{1}{2}}$. Further, the Young's Modulus was calculated and was found to average about 388 GPa.

EXAMPLE 10

This Example was conducted substantially in accordance with Example 8 with the exception that about 2.5 percent of the preform by weight comprised AESAR's aluminum powder (−325 mesh, substantially all particle diameters smaller than about 45 μm, 99.8 percent pure, Aesar Group of Johnson Matthey Co., Seabrook, N.H).

Specifically, about 9.75 grams of 1000 grit TETRABOR ® boron carbide powder (5 μm average particle diameter, ESK Engineered Materials, New Canaan, Conn.) and about 0.25 grams of aluminum powder were mixed with about 12 grams of methylene chloride (J. T. Baker Co., Phillipsburg, N.J.) and about 0.1 grams of XUS 40303.00 Experimental Binder (Dow Chemical Co., Midland, Mich.) to form a slurry. Specifically, the boron carbide and aluminum powders were dry milled on a ball mill in a NALGENEI ® plastic jar (Nalge Co., Rochester, N.Y.) for about 8 hours. A solulllon comprising the methylene chloride and the binder was then added to the mixture of boron carbide and aluminum powders to form a slurry. The resultant slurry was sediment last into a one inch (25 mm) diameter graphite crucible (Grade ATJ, Union Carbide Co., Carbon Products Div., Cleveland, Ohio). The graphite crucible containing the cast slurry was placed into a plastic bag and permitted to dry overnight. The graphite crucible was then removed from the plastic bag and placed into an oven to dry for about 1 hour at a temperature of about 45° C. followed by an about 2 hour bake at a temperature of about 70° C. The resultant preform assembly weighed about 40.6 grams and measured about 0.5 inches (13 mm) in thickness.

The binder was removed from the preform by placing the graphite crucible containing the preform into a vacuum furnace. The furnace was twice evacuated and backfilled with argon. During the subsequent heating steps, argon was passed through the furnace at a rate of about 2 liters per minute. The temperature of the furnace was raised from substantially room temperature to a temperature of about 350° C. at a rate of about 100° C. per hour. The temperature was then increased to about 450° C. at a rate of about 50° C. per hour. The temperature was then increased to about 725° C. at a rate of about 100° C. per hour. After maintaining a temperature of about 725° C. for about 1 hour, power to the furnace was interrupted and the furnace was allowed to cool back to room temperature. After reaching substantially room temperature, the graphite crucible containing the preform was removed from the furnace. The weight of the graphite crucible and its contents was about 40.5 grams. The calculated bulk density of the preform was about 1.41 grams per cubic centimeter, which converts to about 56 percent of the theoretical density of boron carbide.

About 53.9 grams of nuclear grade zirconium sponge (Western Zirconium, Ogden, Utah) was placed into a NALGENE® plastic jar (Nalge Co., Rochester, N.Y.) and roll mixed for about 8 hours. After mixing, about 3.7 grams of a binder solution comprising by weight about 0.8 percent XUS 40303.00 Experimental Binder (Dow Chemical Co.) and the balance methylene chloride was added to the milled powder to form a slurry. The Nalgene jar and its slurry were then placed on an EBERBACH® shaker (Eberbach Corp., Ann Arbor, Mich.) and shaken for about one-half hour. The slurry of zirconium sponge and binder solution was then poured into the graphite crucible. The graphite crucible and its contents were then placed into a drying box and allowed to dry overnight. The graphite crucible and its contents was then placed into a drying oven at a temperature of about 45° C. After drying for about 1 hour at about 45° C., the drying was continued for about 2 hours more at a temperature of about 70° C. After drying, the graphite crucible and its contents weighed about 94.4 grams.

The additional binder was removed in substantially the same manner as was used to remove the original binder in the filler material.

Figure 9:
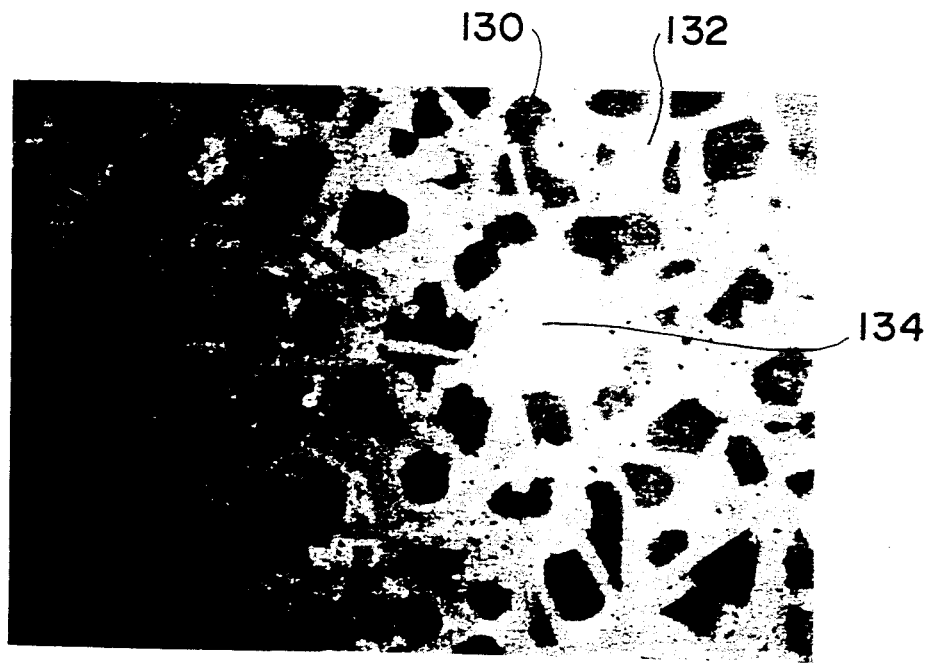
FIG. 9 is a photomicrograph taken at about 400× magnification, of the platelet reinforced composite body fabricated in Example 10.

The lay-up comprising the graphite mold and its contents was then placed into a vacuum furnace at substantially room temperature. The furnace was evacuated and backfilled with argon gas, and then evacuated one more time. The temperature of the furnace was then raised from about room temperature to a temperature of about 1000° C. at a rate of about 210° C. per hour under vacuum. At a temperature of about 1000° C., the furnace was backfilled with argon gas to a gauge pressure of about 2 psi (14 kilopascals). The temperature of the furnace was then increased from about 1000° C. to a temperature of about 1900° C. at a rate of about 211° C. per hour. After maintaining a temperature of about 1900° C. for about 2 hours, the temperature in the furnace was decreased to a temperature of about 500° C. at a rate of about 156° C. per hour. At a temperature of about 500° C., the flow rate of argon gas was increased from about 2 liters per minute to about 10 liters per minute to increase the rate of cooling. The temperature continued to decrease and, upon cooling to a temperature of about 100° C., the furnace was opened and the lay-up was removed from the furnace and disassembled. It was discovered that the zirconium metal had reacted with the preform to form a composite comprising zirconium diboride 130, zirconium carbide 132 and residual metal 134 as shown in the photomicrograph of FIG. 9 which was taken at approximately 400×.

EXAMPLE 11

This Example demonstrates that an additive metal comprising chromium may be admixed with the permeable mass to be reactively infiltrated.

Figure 10:
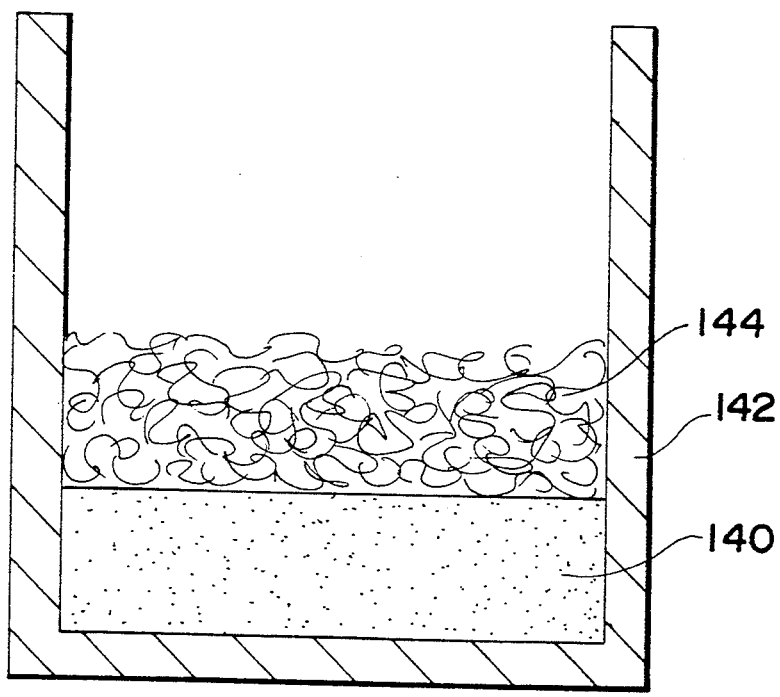
FIG. 10 is a schematic cross-section view of the setup employed in fabricating the platelet reinforced composite body described in Example 11.

FIG. 10 shows a lay-up and cross-section which was utilized to form a composite in accordance with this Example.

In order to create a preform by sedimentation casting, approximately 32.4 grams of 1000 grit TETRABOR® boron carbide particulate (ESK Engineered Materials, New Canaan, Conn.) having an average particle size of about 5 microns was placed into an approximately 250 milliliter NALGENE® plastic bottle (Nalge Co., Rochester, N.Y.) along with about 7.62 grams of chromium particulate (99.8% pure, Atlantic Equipment Engineers Co., Bergenfield, N.J.) having a particle size ranging between about 1 and about 5 microns in diameter and mixed together in a jar mill for about 8 hours. While the powders were being mixed, a binder solution comprising about 0.4 grams of XUS 40303.00 Experimental Binder (Dow Chemical Co., Midland, Mich.) and about 60 grams of methylene chloride (J. T. Baker Co., Phillipsburg, N.J.) was prepared. After the powders had been mixed dry for about 8 hours, the binder solution was added to the NALGENE® plastic bottle (Nalge Co., Rochester, N.Y.) to form a slurry. The bottle and its contents were placed onto a EBERBACH® shaker (Eberbach Corp., Ann Arbor, Mich.) and shaken for about ½ hour. After the slurry admixture 140 had been thoroughly shaken, the admixture was then poured into a Grade ATJ graphite mold 142 (Union Carbide Co., Carbon Products Div., Cleveland, Ohio) the interior of which measured about 2 inches (51 m) square by about 3¼ inches (83 mm) tall. After the sediment had rigidized due to evaporative loss of much of the methylene chloride, the graphite mold 142 and its contents were then sealed in a ZIPLOC® plastic bag (Dow Brand, Indianapolis, Ind.) and allowed to to dry overnight. The plastic bag slowed the rate of methylene chloride evaporation so that the preform would not crack from differential drying shrinkages. The following day the crucible and its contents were removed from the plastic bag and placed into a drying oven at a temperature of approximately 45° C. for a duration of about 1 hour. The temperature of the drying oven was then increased to about 70° C. and the graphite mold 142 and its contents were dried at this temperature for about 2 hours. These drying operations removed substantially all of the methylene chloride vehicle. After drying, the sediment cast preform 140 had approximate dimensions of about 2 inches (51 mm) square by about 0.4 inches (10 mm) thick and weighed about 32.8 grams.

The binder was removed from the preform by placing the graphite mold containing the preform into a vacuum furnace, evacuating the furnace to about 30 inches (762 mm) of mercury vacuum (pressure less than about 133 Pa.) and backfilling the furnace with argon gas to approximately 2 psig (14 kPag). After repeating the evacuation and backfilling steps, an argon gas flow rate of about 2 liters per minute at a pressure of about 2 psig (14 kPag) was established and maintained in the furnace. The furnace temperature was then increased from about room temperature to a temperature of about 350° C. at a rate of about 100° C. per hour. Upon reaching 350° C., the temperature was then increased to about 450° C. at a rate of about 50° C. per hour. Upon reaching 450° C., the temperature was increased to about 725° C. at a rate of about 100° C. per hour. After maintaining a temperature of about 725° C. for about 1 hour, the temperature was decreased to about room temperature at a rate of about 70° C. per hour. Upon cooling to about room temperature, the graphite mold 142 and its contents were removed from the furnace. The weight of the graphite mold 142 and its contents after firing was about 0.4 grams less than the weight before firing. The dimensions of the mold and preform were substantially unchanged. The bulk density of the preform 140 computed to about 1.24 grams per cubic centimeter which converts to about 42.8 percent of the theoretical density of boron carbide.

Figure 11:
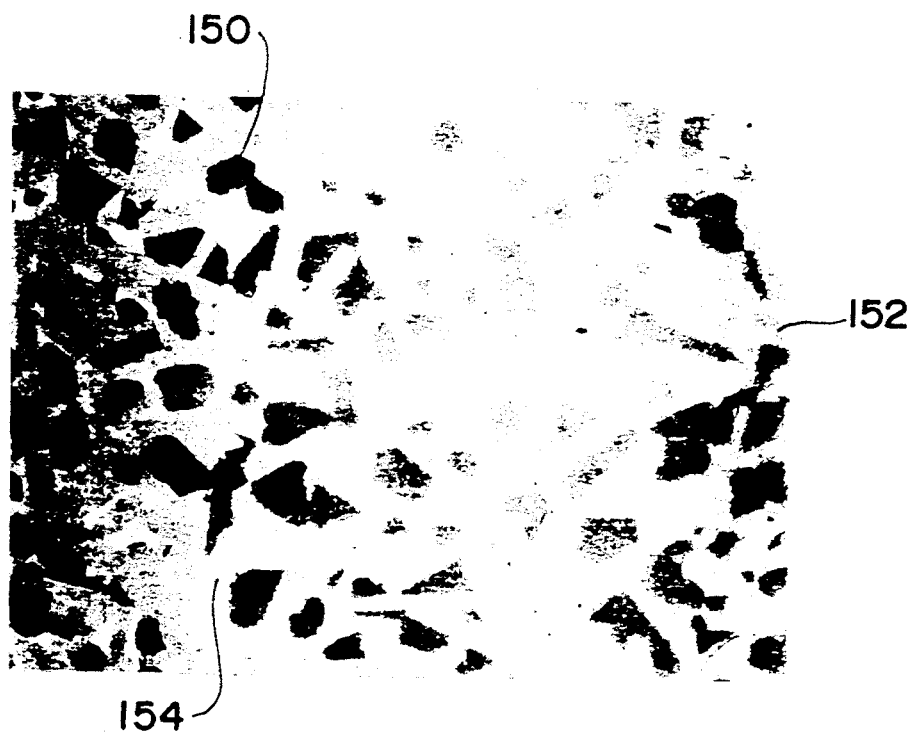
FIG. 11 is a photomicrograph taken at about 400× magnification, of a polished cross-section of the platelet reinforced composite body described in Example 11.

About 196.8 grams of zirconium sponge 144 (Nuclear Grade Western Zirconium Co., Ogden, Utah) parent metal was placed on top of the sediment cast preform 140 contained within the graphite mold 142. The setup comprising the graphite mold 142, the sediment cast preform 140, and the parent metal zirconium sponge 144 was then placed into a vacuum furnace at about room temperature. The furnace was then evacuated to about 30 inches (762 mm) of mercury vacuum (pressure less than about 133 Pa) and then backfilled with argon gas to a pressure of about 2 psig (14 kPag). This evacuation and backfilling procedure was then repeated. Following the is second backfilling with argon, the furnace chamber was evacuated one more time to a final pressure of about $4 \times 10^{-4}$ torr (0.053 Pa). The furnace temperature was then increased from about room temperature to a temperature of about 1900° C. at a rate of about 210° C. per hour. Upon reaching a temperature of about 1000° C., the furnace chamber was backfilled with argon gas to a pressure of about 2 psig (14 kPag) and a gas flow rate of about 2 liters per minute through the furnace was established. The remainder of the run was conducted under this argon atmosphere, After maintaining a temperature of about 1900° C. for about 2 hours, the furnace temperature was then decreased to about 500° C. at a rate of about 150° C. per hour. Upon reaching a temperature of about 500° C., the argon gas flow rate was increased from about 2 liters per minute to about 10 liters per minute to assist in cooling the furnace and the setup. The furnace was allowed to continue to cool. At a temperature of about 100° C., the furnace was opened and the setup was removed from the furnace and disassembled. A platelet reinforced composite body had focmed. A mounted and diamond polished section of the formed composite body is shown in FIG. 11.

The microstructure reveals that the platelet reinforced composite comprises zirconium diboride 150, zirconium carbide 152, and some residual metal 154,

EXAMPLE 12

This Example illustrates utilizing an additive material comprising particulate silicon metal with a boron carbide preform to form a platelet reinforced composite body. The setup employed is substantially the same as that shown in FIG. 10.

In order to create a preform by sedimentation casting approximately 9.2 grams of 1000 grit TETRABOR® boron carbide powder (ESK Engineered Materials, New Canaan, Conn.) having an average particle size of about 5 microns was placed into an approximately 250 milliliter NALGENE® plastic bottle (Nalge Co., Rochester, N.Y.) along with about 0.82 grams of silicon particulate (−325 mesh, Atlantic Equipment Engineers Co., Bergenfield, N.J.) having substantially all particles smaller than about 45 microns and mixed together by rolling onto a jar mill rack for about 8 hours. While the powders were being mixed, a binder solution comprising about 0.1 grams of XUS 40303.00 Experimental Binder (Dow Chemical Co., Midland, Mich.) and about 12 grams of methylene chloride (J. T. Baker Co., Phillipsburg, N.J.) was prepared. After the powders had been dry mixed for about 8 hours, the binder solution was added to the NALGENE® plastic bottle and the bottle and its contents were placed onto an EBERBACH® shaker (Eberbach Corp., Ann Arbor, Mich.) and shaken for about ½ hour. After the slurry had been thoroughly shaken, the admixture was then poured into a graphite mold 142 (Grade ATJ, Union Carbide Co., Carbon Products Div., Cleveland, Ohio), the interior of which measured about 1 inch (25 mm) in diameter by about 2¼ inches (57 mm) tall. The graphite mold and its contents were then placed into a room temperature drying chamber which was contained within a fume hood and the methylene chloride vehicle was allowed to slowly evaporate from the slurry overnight. The following day the graphite mold and its contents were removed from the drying chamber and placed into a drying oven at a temperature of about 45° C. After drying at a temperature of about 45° C. for about 1 hour, the temperature of the drying oven was increased to about 70° C. and the graphite mold and its contents were dried at this temperature for about 2 hours. The drying operations removed substantially all of the methylene chloride vehicle. After the drying operation, the formed sediment cast preform had approximate dimensions of about 1 inch (25 mm) in diameter and about 0.5 inches (13 m) thick. The weight of the graphite mold and its contents was about 40.75 grams of which 31.75 grams was the mold itself, The binder was removed from the sediment cast preform by placing the graphite mold along with the preform contained within into a vacuum furnace, evacuating the furnace to about 30 inches (762 mm) of mercury vacuum (pressure less than about 133 Pa) and backfilling the furnace with argon gas to approximately 2 psig (14 kPag). After repeating the evacuation and backfilling, an argon gas flow rate of about 2 liters per minute at a pressure of about 2 psig (14 kPag) was established and maintained in the furnace. The furnace temperature was then increased from substantially room temperature to a temperature of about 200° C. at a rate of about 33° C. per hour. Upon reaching a temperature of about 200° C., the temperature was then increased to about 350° C. at a rate of about 20° C. per hour. Upon reaching a temperature of about 350° C., the temperature was then increased to about 600° C. at a rate of about 60° C. per hour. Upon reaching a temperature of about 600° C., the temperature was then decreased to approximately room temperature at a rate of about 60° C. per hour. Upon reaching a temperature of about 50° C., the graphite mold 142 and its contents were removed from the furnace. The weight of the graphite mold and its contents after firing was about 40.61 grams, about 0.14 grams less than the weight before firing. The bulk density of the preform computed to about 1.40 grams per cubic centimeter, which converted to about 56 percent of the theoretical density of boron carbide.

About 50.91 grams of zirconium sponge 144 (Nuclear Grade, Western Zirconium Co., Ogden, Utah) was placed on top of the sediment cast preform contained within the graphite mold. The setup comprising the graphite mold and its contents was then placed into a vacuum furnace at substantially room temperature. The furnace was then evacuated to approximately 30 inches (762 mm) (pressure less than about 133 Pa) of mercury vacuum and then backfilled with argon gas. The furnace chamber was evacuated once more to a final pressure of about $3 \times 10^{-4}$ torr (0.040 Pa). The furnace temperature was then increased to a temperature of about 1000° C. at a rate of about 138° C. per hour. Upon reaching a temperature of about 1000° C., the furnace chamber was backfilled with argon gas and a flow 3% rate of about 2 liters per minute at a pressure of about 2 psig (14 kPag) was established. The remainder of the run was conducted under this argon atmosphere. The furnace temperature was then increased from about 1000° C. to a temperature of about 1900° C. at a rate of about 100° C. per hour. After maintaining a temperature of about 1900° C. for about 1 hour, the furnace temperature was decreased to about 1500° C. at a rate of about 50° C. per hour. Upon reaching a temperature of about 1500° C., the furnace cooling was continued down to about room temperature but at a rate of about 100° C. per hour. After the furnace had cooled to about room temperature, the furnace was opened and the setup was removed from the furnace and disassembled. A platelet reinforced composite comprising zirconium diboride, zirconium carbide and residual metal was recovered. It was observed visually that unlike some platelet reinforced composites fabricated without additions of silicon metal to the preform, that the platelet reinforced composite of the present Example did not contain certain bumps and craters on the top surface thereof, i.e., the surface which previously comprised the interface between the boron carbide preform and the zirconium parent metal.

EXAMPLE 13

Figure 12:
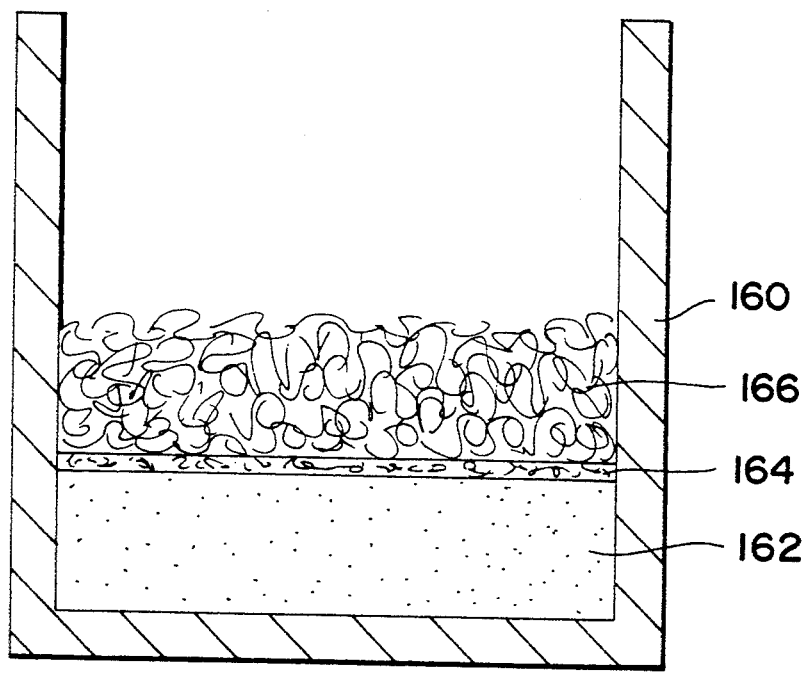
FIG. 12 is a schematic cross-sectional view of the setup employed in fabricating the platelet reinforced composites body described in Example 13.

This Example illustrates that a constituent of the residual metal in the platelet reinforced composite may be introduced as an additive material between the permeable mass to be reactively infiltrated and the adjacent parent metal. The setup used for fabricating such a composite body is shown schematically in FIG. 12.

A preform 162 was fabricated by sedimentation casting a slurry comprising boron carbide particulate, isopropyl alcohol and a binder agent. Specifically, about 0.22 grams of XUS 40303.00 Experimental Binder (Dow Chemical Co., Midland, Mich.) was added to about 38 grams of isopropyl alcohol contained within a 1 liter NALGENE ® plastic bottle (Nalge Co., Rochester, N.Y.). The plastic bottle and its contents were placed into an EBERBACH ® shaker (Eberbach Corp., Ann Arbor, Mich.) and shaken for approximately 1 hour to disperse the binder into the isopropyl alcohol solvent. After dispersing the binder into the solvent, the plastic bottle was opened and about 45 grams of 1000 grit TETRABOR ® boron carbide particulate (ESK Engineered Ceramics, New Canaan, Conn.) having an average particle size of about 5 microns was added to the binder solution in the plastic bottle along with about 4 BURUNDUM ® ball milling stones (U.S. Stoneware Corp., Mahwah, N.J.) each measuring about ½ inch (13 mm) in diameter by about ½ inch (13 mm) tall. The NALGENE ® plastic jar was resealed and placed back onto the EBERBACH ® shaker and shaken again for approximately 2 hours or until the boron carbide particulates were thoroughly dispersed and substantially no agglomerates remained.

The slurry of boron carbide, isopropyl alcohol and binder was immediately poured into a Grade ATJ graphite crucible 160 (Union Carbide Co., Carbon Products Division, Cleveland, Ohio) whose interior measured about 2 inches (51 mm) square by about 3¼ inches (83 mm) tall. The slurry was poured into the crucible at a slight angle to avoid trapping air at the bottom of the pore. The graphite crucible 160 weighed about 245.5 grams.

The graphite crucible 160 and the slurry contained within was then placed into a fume hood and covered with a layer of construction paper to reduce somewhat the rate of evaporation of solvent from the sedimented slurry of boron carbide and binder. The bulk of the isopropyl alcohol solvent evaporated overnight while the crucible 160 and its contents sat in the fume hood at room temperature. The graphite crucible 160 and the sediment cast preform 162 contained within were then placed into a drying oven. After drying for approximately 1 hour at a temperature of about 45° C. in air, at atmospheric pressure, the graphite crucible 160 and its contents were transferred to a drying oven at a temperature of about 70° C.. After drying at approximately 70° C. for about 2 hours, the graphite crucible 160 and its contents were removed from the drying oven and weighed. The sediment cast preform weighed about 40.7 grams and measured about 2 inches (51 mm) square by about 0.49 inches (12 mm) thick.

The graphite crucible 160 and its contents were then fired at a higher temperature to remove the organic binder from the sediment cast boron carbide preform 162. Specifically, the graphite crucible 160 and its contents were placed into a resistance heated controlled atmosphere furnace at room temperature. The furnace chamber was evacuated to about 30 inches (762 mm) of mercury vacuum (pressure less than about 133 Pa) and then backfilled with argon gas. An argon gas flow rate of about 2 liters per minute through the furnace chamber was established. The furnace temperature was then increased to about 200° C. at a rate of about 100° C. per hour. Upon reaching a temperature of about 200° C., the temperature was then increased to about 350° C. at a rate of about 20° C. per hour. Upon reaching a temperature of about 350° C., the temperature was then increased to about 670° C. at a rate of about 64° C. per hour. Upon reaching a temperature of about 670° C., the temperature was decreased to about room temperature at a rate of about 80° C. per hour. Once the furnace had cooled to substantially room temperature, the graphite crucible 160 and the sediment cast boron carbide preform 162 contained within were removed from the furnace chamber. The weight of the preform 162 was found to be about 40.5 grams. A preform bulk density of about 1.25 grams per cubic centimeter was calculated which translated to about 49.7 percent of the theoretical density of boron carbide.

About 18.4 grams of niobium particulate 164 ($-325$ mesh, Atlantic Equipment Engineers Co., Bergenfield, N.J.) having substantially all particles smaller than about 45 μm was poured into the graphite crucible 160 on top of the sediment cast boron carbide preform 162 and leveled. About 228 grams of nuclear grade zirconium sponge 166 (Western Zirconium, Ogden, Utah) was then placed into the graphite crucible 160 on top of the layer of niobium particulate 164 to form a lay-up. The lay-up comprising the graphite crucible 160 and its contents was then placed into a resistance heated controlled atmosphere furnace at substantially room temperature. The furnace chamber was evacuated to about 30 inches (762 mm) of mercury vacuum (pressure less than about 133 Pa) and then backfilled with argon gas. The furnace chamber was evacuated a second time to a final pressure of about $1.8 \times 10^{-4}$ torr (0.024 Pa). The furnace temperature was then increased from about room temperature to about 1950° C. at a rate of about 213° C. per hour. From room temperature to about 1000° C. the furnace chamber was heated under vacuum. At a temperature of about 1000° C., the furnace chamber was backfilled with argon gas to a pressure of about 2 psig (14 kPag). An argon gas flow rate of about 2 liters per minute through the furnace chamber was established. During the switch from vacuum to argon gas atmospheres, the furnace heating rate was not interrupted. The remainder of the run was carried out under this argon gas atmosphere. After maintaining a temperature of about 1950° C. for about 2 hours, the temperature was then decreased to about 1500° C. at a rate of about 90° C. per hour. Upon reaching a temperature of about 1500° C., the rate of furnace cooling was increased such that a temperature substantially equal to room temperature was reached in about 4 hours. After the furnace had cooled to substantially room temperature, the furnace was opened and the lay-up was removed from the furnace and disassembled. A platelet reinforced composite comprising zirconium diboride, zirconium carbide and residual metal was recovered.

EXAMPLE 14

This Example demonstrates that a platelet reinforced composite which includes an additive material possesses improved resistance to oxidation. Four preforms were fabricated from powder mixtures. Three of the preforms included an additive material. The remaining preform did not include an additive material in order to illustrate the effects of utilizing an additive material.

The powder mixtures which were utilized to produce the preforms for the formation of oxidation resistant ceramic matrix composite bodies were fabricated on the basis of about 19.5 grams of TETRABOR ® 1000 grit (average particle diameter of about 5 μm) boron carbide (ESK Engineered Ceramics, New Canaan, Conn.), about 130 grams of −325 mesh (particle diameter less than about 45 μm) zirconium parent metal powder (Teledyne Wah Chang Albany, Albany, Oreg.) and respectfully, one of the following: 1) about 6.4 grams of silicon hexaboride, $SiB_6$ (Consolidated Astronautics, Saddle Brook, N.J.); 2) about 6.5 grams of silicon tetraboride, $SiB_4$ (Atlantic Equipment Engineers, Bergenfield, N.J.); 3) about 8.5 grams of 1000 grit (average particle diameter of about 5 μm) silicon carbide, SiC (Exolon-ESK Corporation, Tonawanda, N.Y), and 4) no additive powder. Each preform was made by first combining two alumina milling balls having a diameter of about 0.5 inch (13 mm), about 30 grams of methanol, about 19.5 grams of boron carbide powder, and the specified amounts of the additive powder into a plastic bottle. The plastic bottle was closed securing the lid of the plastic bottle. Tape was wrapped around the perimeter of the lid of the plastic bottle to prevent any leaking. The plastic bottle and its contents were placed onto a reciprocating shaker for about 2 hours. The lid of the plastic bottle was then removed and the plastic bottle and its contents were placed into a laboratory hood. After the methanol had substantially completely evaporated from the $B_4C$-additive powder mixture, two additional alumina milling balls having a diameter of about 0.5 inch (13 mm) were placed into the plastic bottle and the plastic bottle was closed by resecuring the lid onto the plastic bottle. The plastic bottle and its contents were then placed on a jar mill for about 2 hours to break up any agglomerates in the $B_4C$-additive powder mixture. The milled $B_4C$-additive powder mixture was then sieved through a 60 mesh (opening of about 250 μm) and about 130 grams of zirconium powder were hand blended into the $B_4C$-additive powder mixture to form a preform mixture. Once substantially homogeneously blended, each preform mixture was placed into a steel die having an inner cavity measuring about 2 inches (51 mm) wide and about 2 inches (51 m) long. After the preform mixture was substantially level, a ram was placed in contact with the preform mixture and the preform mixture was consolidated at a pressure of about 10,000 pounds per square inch (70 MPa). The end of the consolidation step produced preforms measuring about 2 inches (51 mm) long, about 2 inches (51 mm) wide and about 0.8 inch (20 mm) thick. The preforms were placed into graphite boats having Inner cavities measuring about 2 inches (51 mm) long, about 2 inches (51 mm) wide, about 3.25 inches (83 mm) deep and having a wall thickness of about 0.25 inch (6.4 mm). The graphite boats were machined from Grade ATJ graphite (Union Carbide Corporation, Carbon Products Division, Cleveland, Ohio). A hafnium sponge material was placed onto the surface of each preform contained within a graphite boat. The hafnium sponge material functioned as an oxygen getter for the processing atmosphere, as discussed below. Several graphite boats containing the preforms comprised of boron carbide additive powder, zirconium parent metal powder and hafnium getter material were placed into a graphite tray to form a lay-up.

The lay-up and its contents were placed into a vacuum furnace and the vacuum furnace door was closed. The vacuum furnace chamber was evacuated, then filled with argon at a flow rate of about 10 liters per minute and evacuated a second time to a pressure of about $1.4 \times 10^{-4}$ torr (0.019 Pa). The vacuum pump was disengaged from the vacuum furnace chamber and argon gas was introduced into the vacuum furnace chamber at a flow rate of about 10 liters per minute until an overpressure of 2 pounds per square inch (14 kPa) was attained, then the argon flow rate was reduced to about 2 liters per minute. The vacuum furnace and its contents were then heated from about room temperature to about 2000° C. in about 9 hours, held at about 2000° C. for about 2 hours and cooled from about 2000° C. to about room temperature in about 8 hours while maintaining an argon flow rate of about 2 liters per minute at an overpressure of about 2 pounds per square inch (0.14 kg/cm$^2$). At about room temperature, the vacuum furnace door was open and the lay-up and its contents were removed to reveal that the preforms had reacted to form ceramic matrix composite bodies containing the additive materials and one ceramic matrix composite body containing no additive material.

Figure 13:
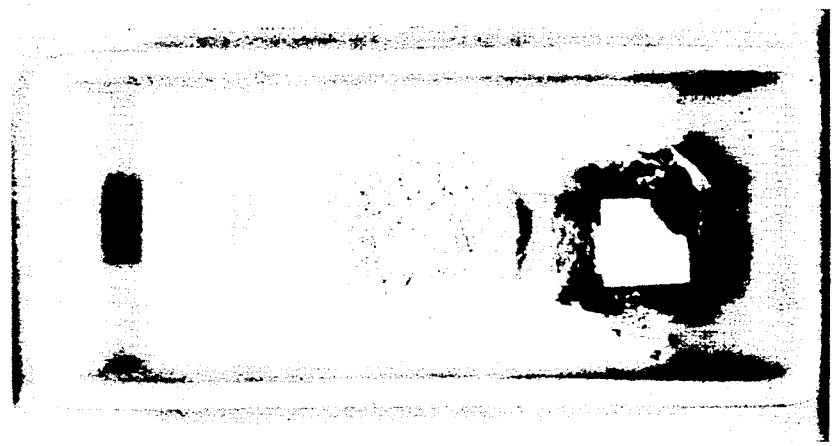
FIG. 13 is a photomicrograph of the ceramic composite bodies fabricated in accordance with Example 14 after testing their oxidation resistance.

The composite bodies containing no additive material, the composite body containing the silicon carbide (SiC) additive and the composite body containing the silicon hexaboride ($SiB_6$) additive were cut into coupons measuring about 0.4 inch (10 mm) long, 0.4 inch (10 mm) wide and about 0.2 inch (5.1 mm) thick. The coupons were placed into an alumina boat to form a lay-up. The lay-up and its contents were then placed into a tube furnace and the tube furnace and its contents were heated from about room temperature to about 1000° C. at about 200° C. per hour, held at 1000° C. for about 24 hours and cooled from about 1000° C. to about room temperature at about 200° C. per hour. At about room temperature, the alumina boat and its contents were removed from the tube furnace. As FIG. 13 reveals, the composite body 170 containing no additive material had oxidized, the ceramic composite body 172 containing the silicon carbide additive had oxidized beyond recognition, while the ceramic composite body 174 with the silicon hexaboride additive had maintained its shape and exhibited a weight gain of only about 1.4 percent. Thus, this Example demonstrates that the addition of silicon hexaboride to composite bodies formed by the reactive infiltration of a zirconium parent metal powder into a permeable mass comprising boron carbide and an additive material may possess improved oxidation resistance.

EXAMPLE 15

This Example demonstrates a method for forming ceramic matrix composite bodies which Incorporate an additive material. A plurality of preforms were fabricated, each of which Included a different additive material. The fabricated preforms were reactively infiltrated with a molten parent metal.

Table I contains a summary for Sample A through Sample K of the weight percent boron carbide, weight percent additive, and weight percent parent metal powder used to make preforms for the formation of ceramic matrix composite bodies. Further, Table I Includes the density of the resultant ceramic matrix composite bodies.

TABLE I

| Sample | Weight Percent 1000 grit B$_4$C | Weight Percent Additive Material | Weight Percent −325 Mesh Zr Percent Metal Powder | Density Ceramic Composite |
| --- | --- | --- | --- | --- |
| A | 12.2 | 6.6 (Al$_2$O$_3$) | 81.2 | 5.46 |
| B | 11.8 | 9.5 (ZrO$_2$) | 78.7 | 5.65 |
| C | 11.6 | 11.3 (CeO$_2$) | 77.1 | 5.60 |
| D | 12.0 | 8.2 (Y$_2$O$_3$) | 79.8 | 5.92 |
| E | 11.7 | 10.4 (La$_2$O$_3$) | 77.9 | 5.89 |
| F | 12.3 | 6.0 (MgAl$_2$O$_4$) | 81.7 | 5.24 |
| G | 12.3 | 5.4 (SiC) | 82.3 | 5.71 |
| H | 11.0 | 15.4 (HfO$_2$) | 73.6 | 5.80 |
| I | 12.2 | 6.6 (Al$_2$O$_3$) | 81.2 | 5.42 |
| J | 11.8 | 9.2 (ZrO$_2$) | 79.0 | 5.98 |
| K | 13.0 | 0 | 87.0 | 6.11 |

Powder mixtures used to produce preforms corresponding to Samples A through Sample K of Table I were made on the basis of about 19.5 grams of TETRABOR® 1000 grit (average particle diameter of about 5 μm) boron carbide (ESK Engineered Ceramics, New Canaan, Conn.), about 130 grams of −325 mesh (particle diameter less than about 45 μm) zirconium parent metal powder (Teledyne Wah Chang Albany, Albany, Oreg.) and one of each of the following different additives: (A) regular ground alumina (Alcan Chemical, Cleveland, Ohio), Grade TZ-3Y (average particle diameter of about 0.3 lm); (B) zirconia (Tosoh USA, Atlantic, Ga.); (C) cerium oxide (Atlantic Equipment Engineers, Bergenfield, N.J.); (D) yttrium oxide (MolyCorp, Inc., a Unocal Company, White Plains, N.Y.); (E) lanthanum oxide (MolyCorp, Inc., a Unocal Company, White Plains, N.Y.); (F) −325 mesh (particle diameter less than about 45 μm) magnesium aluminate spinel (Atlantic Equipment Engineers, Bergenfield, N.J.); (G) 1000 grit (average particle diameter of about 5 μm) silicon carbide (ESK Engineered Ceramic, New Canaan, Conn.); (H) hafnium oxide (Consolidated Astronautics, Saddle Brook, N.J.); (I) Grade T-64 alumina (Alcoa, Pittsburgh, Pa.); (J) Grade MS2 (average particle diameter less than about 2 μm) zirconia (Magnesium Electron, Inc., Flemington, N.J.) and (K) which did not include an additive material. Each preform was made by first combining two alumina milling balls each having a diameter of about 0.5 inch (13 mm), about 30 grams of methanol, about 19.5 grams of boron carbide powder, and the specified amount of one additive, as shown in Table I, in a plastic bottle. The plastic bottle was closed by securing the lid of the plastic bottle. Tape is was wrapped around the perimeter of the lid of the plastic bottle to prevent leaking. The plastic bottle and its contents were placed onto a reciprocating shaker for about 2 hours. The lid of the plastic bottle was then removed and the plastic bottle and its contents were placed into a laboratory hood. After the methanol had substantially completely evaporated from the B$_4$C-additive mixture, two additional alumina milling balls were placed into the plastic bottle and the lid of the plastic bottle was closed by resecuring the lid onto the bottle. The plastic bottle and its contents were then placed on a jar mill for about 2 hours to break up any agglomerates in the B$_4$C-additive mixture. The milled B$_4$C-additive mixture was then sieved through a 60 mesh (opening of about 250 μm) screen. About 130 grams of zirconium powder were hand blended into the seived B$_4$C-additive mixtures to form preform mixtures. Once substantially homogeneously blended, the preform mixtures were placed, one at a time, into a steel die having an inner cavity measuring about 2 inches (51 mm) wide and about 2 inches (51 mm) long. After the preform mixture was substantially leveled, a ram was placed in contact with the leveled preform mixture within the steel die and the preform mixture was consolidated with a pressure of about 10,000 lbs per square inch (70 MPa). The consolidation step produced preforms measuring about 2 inches (51 mm) long, about 2 inches (51 mm) wide and about 0.8 inch (20 mm) thick. The preforms were then placed into graphite boats having inner cavities, measuring about 2 inches (51 mm) long, about 2 inches (51 mm) wide, about 3.25 inches (83 mm) deep and having a wall thickness of about 0.25 inches (6.4 mm). The graphite boats were machined from Grade ATJ graphite (Union Carbide Corporation, Carbon Products Division, Cleveland, Ohio). A hafnium sponge material was placed onto the surface of each preform contained within the respective graphite boats. The hafnium sponge material functioned as a oxygen getter for the processing atmosphere as discussed below. The graphite boats and their contents were placed into a graphite tray to form a lay-up.

The lay-up and its contents were placed into a vacuum furnace, and the vacuum furnace door was closed. The vacuum furnace chamber was evacuated, filled with argon at a flow rate of at least 10 llters per minute and evacuated a second time to a pressure of about $1.4 \times 10^{-4}$ torr (0.019 Pa). The vacuum pump was disengaged from the vacuum furnace is chamber and argon gas was introduced into the vacuum furnace chamber at a flow rate of about 10 liters per minute until an overpressure of about 2 pounds per square inch (14 kPa) was attained, then the argon flow rate was reduced to about 2 liters per minute. The vacuum furnace and its contents were then heated from about room temperature to about 2000° C. in about 9 hours, held at 2000° C. for about 2 hours and cooled from about 2000° C. to about room temperature in about 8 hours while maintaining in argon flow rate of about 2 liters per minute at an overpressure of about 2 pounds per square inch (14 kPa). At about room temperature, the furnace was opened and the lay-up and its contents were removed to reveal that the parent metal powder and the boron carbide had reacted to form ceramic matrix composite bodies incorporating an additive material. The previously-identified Table I also contains a summary of the densities of a resultant ceramic matrix composite bodies which as measured by a method that was substantially similar to ASTM C373-56 Standard Method of Test for Water Absorption Bulk Density, Apparent Porosity Apparent Specific Gravity of Fired Porous Whiteware Products.

EXAMPLE 16

The following Example demonstrates a method for the formation of ceramic matrix composite bodies incorporating a variety of additives by the method of the present invention.

Eight preforms were prepared, which each comprised TETRABOR ® 1000 grit (average particle diameter of about 5 μm, ESK Engineered Ceramics, New Canaan, Conn.) boron carbide and a different additive material selected from following additive compositions: (1) −325 mesh (particle diameter less than 45 μm) magnesium oxide, (2) alumina (Alcan Corporation, Montreal, Canada), (3) yttrium oxide (Rhone-Pulenc, Inc., Chemicals Division, Princeton, N.J.), (4) Grade TZ-3Y (average particle diameter of about 0.3 μm) zirconia (Tosoh USA, Atlanta, Ga.), (5) zirconia (Magnesium Elektron, Inc., Flemington, N.J.), (6) cerium oxide, (7) −200 mesh (particle diameter less than about 75 μm) magnesium aluminate spinal (Atlantic Equipment Engineers, Bergenfield, N.J.), and (8) ytterbium oxide (MolyCorp, Inc., a Unocal Company, White Plains, N.Y.). Each preform was prepared by first placing about 45 grams of the 1000 grit (average particle diameter of about 5 μm) baron carbide into a plastic bottle, along with an amount of one of the above-listed additives equal to about 10 volume percent of the boron carbide. The lid to the plastic bottle was secured, and the plastic bottle and its contents were hand shaken in order to mix the boron carbide and the additive to form a substantially homogeneous B$_4$C-additive mixture. The B$_4$C-additive mixture was then poured into the bottom of a graphite boat (Grade ATJ graphite, Union Carbide Corporation, Carbon Products Division, Cleveland, Ohio) having an inner cavity measuring about 2 inches (51 mm) long, by about 2 inches (51 mm) wide, by about 3.25 inches (83 mm) deep, and having a wall thickness of about 0.25 inch (6.4 mm). The B$_4$C-additive mixture was leveled, and the graphite boat and its contents were placed on a tap density meter (Model 2003 Stampfvolumeter, J. Engelsmann AG, West Germany) in order to tap load the B$_4$C-additive mixture within the graphite boat. The graphite boat and its contents were tapped about 500 times in order to consolidate the B$_4$C-additive mixture to form a preform. About 610 grams of nuclear grade −¼ mesh +20 mesh (particle diameter from about 0.85 mm to about 6.3 mm) zirconium metal sponge were then poured onto the preform within the graphite boat.

The eight graphite boats and their contents were placed onto a graphite tray to form a lay-up. The lay-up and its contents were placed into a vacuum furnace, and the vacuum furnace door was closed. The vacuum furnace chamber was evacuated to about $2 \times 10^{-4}$ torr (0.027 Pa) and filled with argon at a rate of about 10 liters per minute until an overpressure of about 2 pounds per square inch (14 kPa) was obtained, then the argon flow rate was reduced to about 2 liters per minute. The vacuum furnace and its contents were then heated from about room temperature to about 2000° C. in about 8 hours, held at about 2000° C. for about 2 hours, and cooled from about 2000° C. to about room temperature in about 8 hours while maintaining the argon flow rate at about 2 liters per minute and an overpressure of about 2 pounds per square inch (14 kPa). At about room temperature, the argon flow rate was interrupted and the vacuum furnace door was opened to reveal that the zirconium metal had reactively infiltrated the preforms comprised of the B$_4$C-additive mixtures.

Figure 14:
FIGS. 14 through 21 are photomicrographs taken at about 1000× magnification, of cross-sections of the composites formed according to Example 16.
Figure 15:
Figure 16:
Figure 17:
Figure 18:
Figure 19:
Figure 20:
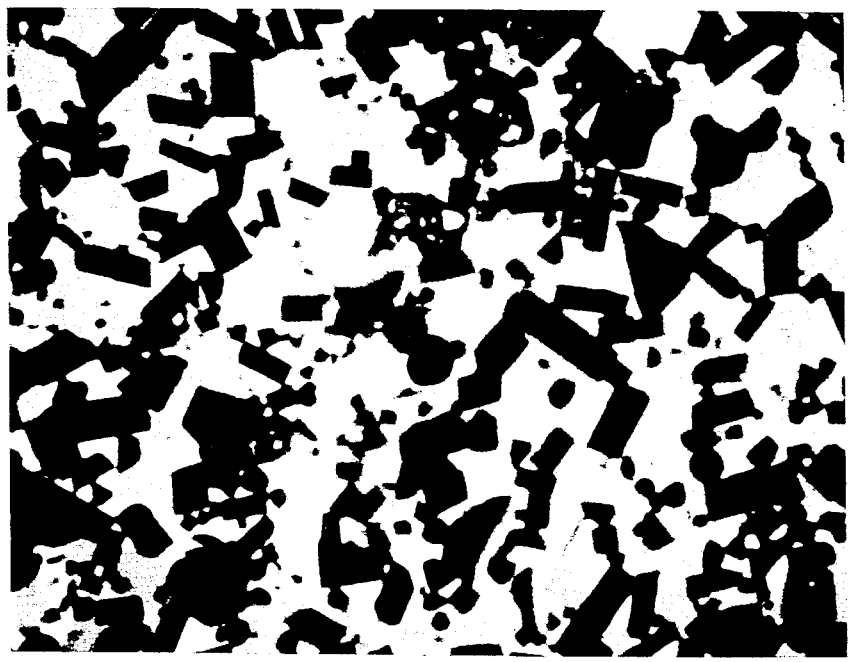
Figure 21:

The resultant ceramic composite bodies were cross sectioned, mounted and polished for metallographic examination by a scanning electron microscope set in the back scattered electron mode. Specifically, FIG. 14 is a photomicrograph taken at about 1000× corresponding to the ceramic matrix composite body incorporating the −325 mesh (particle diameter less than about 45 μm) magnesium oxide additive. FIG. 15 is a photomicrograph taken at about 1000× corresponding to the ceramic matrix composite body incorporating the alumina additive. FIG. 16 is a photomicrograph taken at about 1000× corresponding to the ceramic matrix composite body incorporating the yttrium oxide additive. FIG. 17 is a photomicrograph taken at about 1000× corresponding to the ceramic matrix composite body incorporating the Grade TZ-3Y zirconia additive. FIG. 18 is a photomicrograph taken at about 1000× corresponding to the ceramic matrix composite body incorporating the zirconia (Magnesium Elektron, Inc.) additive. FIG. 19 is a photomicrograph taken at about 1000× corresponding to the ceramic matrix composite body incorporating the cerium oxide additive. FIG. 20 is a photomicrograph taken at about 1000× corresponding to the ceramic matrix composite body incorporating the magnesium aluminate spinel additive. FIG. 21 is a photomicrograph taken at about 1000× corresponding to the ceramic matrix composite body incorporating the ytterbium oxide additive.

EXAMPLE 17

Figure 22:
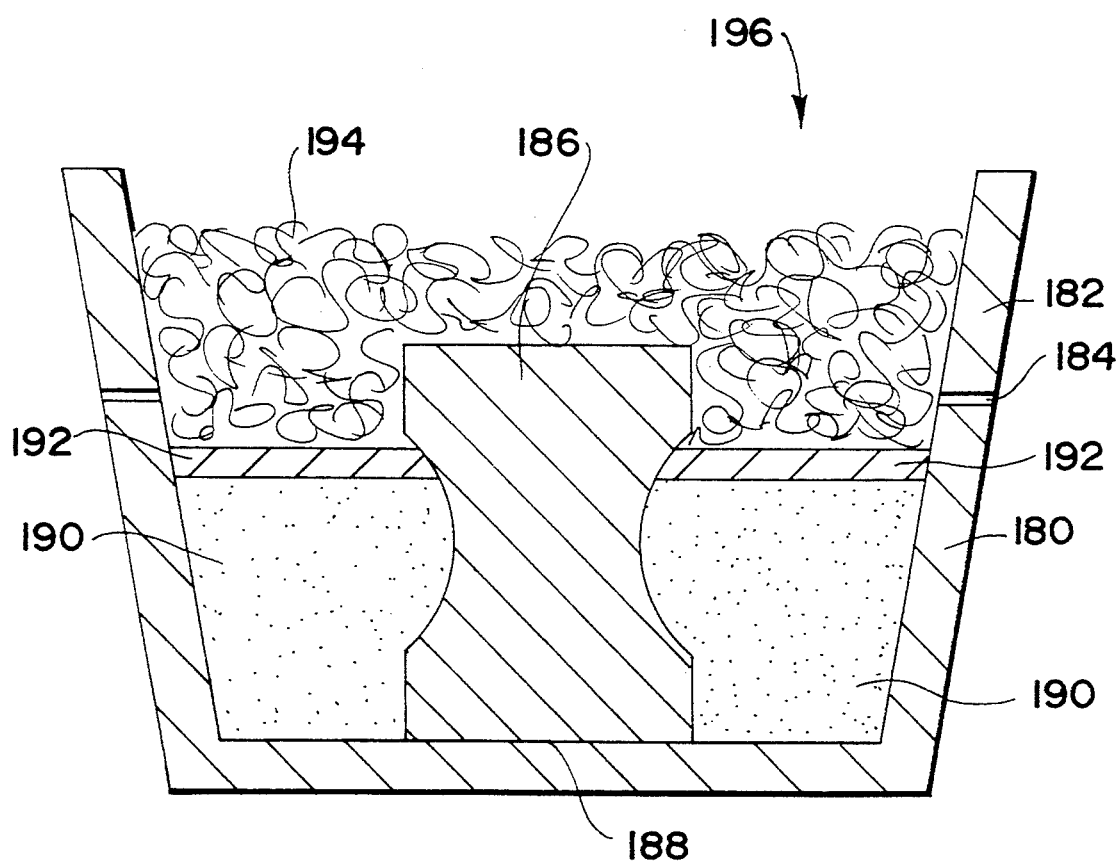
FIG. 22 is a schematic cross-sectional view of the setup employed to fabricate the platelet reinforced composite extrusion die described in Example 17.

This Example illustrates utilizing an additive material which was applied to the interface between the permeable mass comprising boron carbide and the parent metal. Specifically, this Example was utilized to fabricate a platelet reinforced composite extrusion die. The setup which was employed in carrying out the fabrication of this extrusion die is illustrated schematically in FIG. 22.

The graphite containment means for the boron carbide material, the interfacial additive material, and the parent metal was assembled. Specifically, a Grade ATG graphite crucible 180 (Union Carbide Corporation, Carbon Products Division, Cleveland, Ohio) measuring in its interior about 2.0 inches (51 mm) In diameter by about 3.25 inches (83 mm) tall was increased in total height by about 1.0 inch (25 mm) by gluing a is graphite tube 182 to the top of the crucible. The inside and outside diameters of the graphite extension tube 182 were substantially the same as those of the graphite crucible 180. The banding means comprised a layer of GRAPHI-BOND ® colloidal graphite cement 184 (Aremco Products Inc., Ossining, N.Y.). The bonded graphite pieces were then placed into a drying oven at a temperature of about 120° C. After about three hours at a temperature of about 120° C., the graphite cement had substantially cured to completion and the bonded graphite bodies 162, 180 were removed from the drying oven.

The inner surface of the platelet reinforced composite extrusion die to be formed was defined and bounded by a Grade ATJ graphite mandrel 186 (Union Carbide Corp., Carbon Products Divisions Cleveland, Ohio). This graphite mandrel 186 was fixed in place by bonding to the center of the base of the graphite containment means or cruclble located above. A band 188 between the mandrel and the crucible was achloved using GRAPHI-BOND ® cement by substantially the same technique as described previously.

About 39 grams of 1000 grit TETRABOR ® boron carbide particulate 190 (ESK-Engineered Ceramics, New Caanan, Conn.) having an average particle size of about 5 µm was poured into the cavity between the walls of the graphite crucible 180 and the graphite mandrel 186 and levelled. The graphite crucible 180 and its contents were then placed into a Model 2003 STAV tap volume meter (Stampfvolumeter, J. Engellmann, A. G. Federal Republic of Germany) and tap loaded about 500 times to compact the loose baron carbide particulate into a semi-rigid preform and to minimize as much entrapped air as possible. About 7.26 grams of nioblum particulate 192 (−325 mesh, Atlantic Equipment Engineers, Bergenfield,, N.J.), having substantially all particles smaller than about 45 µm in diameter was sprinkled substantially evenly over the tap loaded layer of boron carbide particulate 190 in the graphite crucible 180. About 290.53 grams of nuclear grade zirconium sponge 194 (Western Zirconium, Ogden, Utah) was then placed into the graphite crucible 180 on top of the levelled layer of niobium particulate 192 to form a lay-up 196.

Figure 23A:
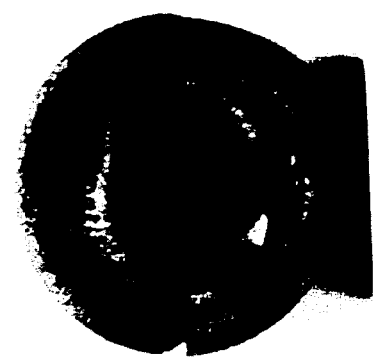
FIGS. 23a, 23b and 23c are top, bottom, and cross-sectional views, respectively, of the formed platelet reinforced composite extrusion die; and described in Example 17.
Figure 23B:
Figure 23C:
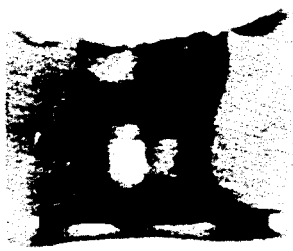

The lay-up 196 comprising the graphite crucible and its contents was then placed into a vacuum furnace at about room temperature. The vacuum chamber was evacuated to about 30 inches (762 mm) of mercury vacuum (pressure less than about 133 Pa) using a mechanical roughing pump and then back-filled with argon gas. After repeating this evacuation and back-filling procedure, the vacuum chamber was evacuated once more to about 30 Inches (762 mm) of mercury vacuum (pressure less than about 133 Pa). A high vacuum source was then connected to the vacuum chamber and the chamber was evacuated to a final working pressure of about $2 \times 10^{-4}$ torr (0.027 Pa). The furnace temperature was then increased from about room temperature to a temperature of about 1950° C. at a rate of about 192° C. per hour. Upon reaching a temperature of about 1000° C., the vacuum chamber was back-filled with argon gas. An argon gas flow rate of about two liters per minute at a pressure of about 2 psig (14 kPa) was astablishad through the vacuum chamber. The remainder of the furnace run was executed under this argon atmosphere. After maintaining a temperature of about 1950° C. for about two hours, the furnace temperature was then decreased to about 1400° C. at a rate of about 92° C. per hour. Upon reaching a temperature of about 1400° C., the furnace temperature was further decreased to about room temperature at a rate of about 274° C. per hour. The lay-up 196 was removed from the furnace at about room temperature. The lay-up 196 was disassembled to reveal that a platelet reinforced composite body had formed. The formed body had substantially the net-shape of the desired extrusion die. Specifically, the outside diameter of the formed body was defined by the inside diameter of the graphite-crucible 180 and the inner-surface of the formed body conformed to the outer-surface of the graphite mandrel 186. The formed platelet reinforced composite extrusion die was sectioned vertically using electro-discharge machining (EDM). FIGS. 23a, 23b and 23c show top, bottom, and cross-sectional views, respectively, of the formed extrusion die. Some excess platelet reinforced composite material was mounted in plastic, polished using diamond paste, and examined in an optical microscope. Quantitative image analysis of the fields examined by the optical microscope revealed that the formed platelet reinforced composite comprised about 16 volume percent residual metal and the balance zirconium diboride and zirconium carbide.

EXAMPLE 18

The following Example further demonstrates a method for the formation of ceramic matrix composite bodies incorporating a variety of additives by the method of the present invention.

Five preforms were prepared, each preform comprising TETRABOR ® 1000 grit (average particle diameter of about 5 µm), boron carbide (ESK Engineered Ceramics, New Canaan, Conn.) and having a different additive material selected from the following additive compositions: 1) −325 mesh (particle diameter less than about 45 µm) zirconium oxide, 99.9% pure (Atlantic Equipment Engineers, Bergenfield, N.J.); 2) Grade TZ-3Y yttrlum oxide stabilized zirconia (average particle size about 0.3 µm) (Tosoh USA, Atlanta, Ga.); 3) zircon powder (Excelopax, Tam Ceramics, Niagara Falls, N.Y.); 4) −325 mesh (particle diameter less than about 45 µm) hafnium oxide, 99.95% pure (Consolidated Astronautics, Saddle Brook, N.J.); and 5) yttrium oxide (Research Chemicals, Nucor Corporation, Phoenix, Ariz.). Each preform was prepared by first placing about 40.5 grams of the 1000 grit boron carbide into a plastic bottle, along with an amount of each one of the above listed additives equal to about 10 volume percent of the boron carbide. The lid to the plastic bottle was secured, and the plastic bottle and its contents were placed onto an orbital mixer to form a substantially homogeneous boron carbide-additive mixture. After about 2 hours, the plastic bottle and its contents were removed from the orbital mixer.

A graphite boat (Grade ATJ graphite, Union Carbide Corporation, Carbon Products Division, Cleveland, Ohio) having an internal cavity measuring about 2 inches (51 mm) square by about 3.25 inches (83 mm) deep was prepared by cleaning the surfaces with ethyl alcohol. A temperature of about 100° C. was established within a drying oven and the graphite boat was placed within the drying oven. When the graphite boat was substantially completely dry, it was removed from the oven and the boron carbide-additlve mixture was poured into the bottom of the graphite boat. The boron carbide-additive mixture was leveled, and the graphite boat and niobium partlculato 192 to form a lay-up 196. its contents were placed on a tap density meter (Model 2003 Stampfvolumeter, J. Englesmann AG, West Germany) in order to tap load the boron carbide-additive mixture within the graphite boat. The graphite boats containing the first four mixtures were tapped about 500 times in order to consolidate the boron carbide-additive mixture to form a preform. The graphite boat containing the fifth mixture was tapped about 300 times in order to consolidate the boron carbide-additive mixture to form a preform. About 322 grams of $-\frac{1}{4}$ mash+20 mesh (particle diameter from about 0.85 mm to about 6.3 mm) nuclear grade zirconium metal sponge (Western Zirconium Company, Ogden, Utah) were then carefully poured onto the preform within the graphite boat. A temperature of about 40° C. was established within a drying oven. The five graphite boats and their contents were placed into the drying oven overnight.

The five graphite boats and their contents were removed from the drying oven and were placed onto a graphite tray to form a lay-up. The lay-up and its contents were placed into a vacuum furnace, and the vacuum furnace door was-closed. The vacuum furnace chamber was evacuated to about $2 \times 10^{-4}$ torr (0.027 Pa) and backfilled with argon gas at a rate of about 2 liters per minute until an overpressure of about 2 pounds per square inch (14 kPa) was obtained. An argon gas flow rate of about 2 liters per minute was maintained, and the vacuum furnace and its contents were heated from about room temperature to about 2000° C. in about 4 hours. After maintaining a temperature of about 2000° C. for about 2 hours, the furnace temperature was decreased to about room temperature in about 3.5 hours. At about room temperature, the argon gas flow was interrupted and the vacuum furnace door was opened to reveal that the zirconium metal had reactively infiltrated the preforms comprised of the boron carbide-additive mixtures.

Figure 24:
FIGS. 24 through 28 are photomicrographs taken at about 1000× magnification, of cross-sections of the composites formed according to Example 18.
Figure 25:
Figure 26:
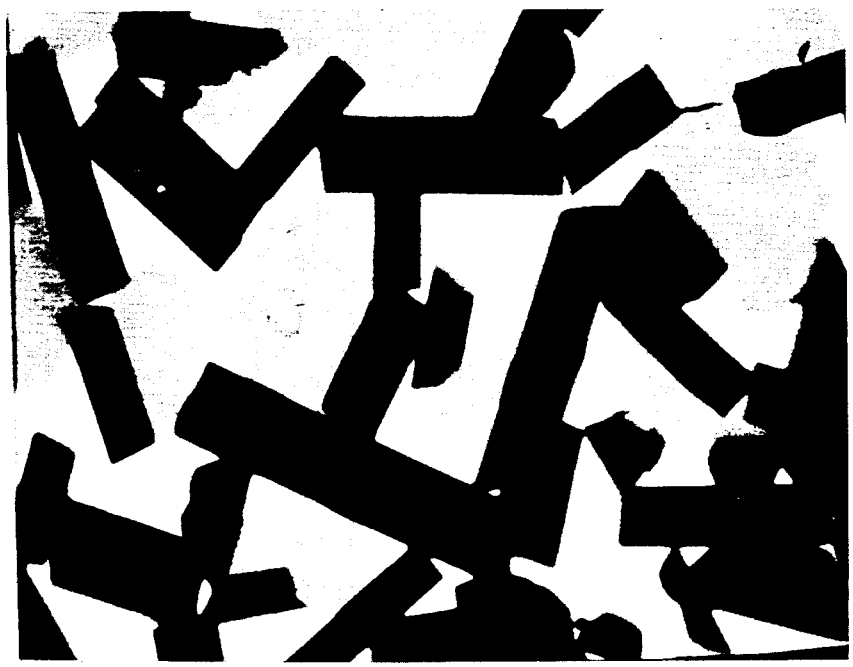
Figure 27:
Figure 28:

The resultant ceramic composite bodies were cross sectioned, mounted and polished for metallographic examination by a scanning electron microscope set in the backscattered electron mode. Specifically, FIG. 24 is a photomicrograph taken at about 1000× corresponding to the ceramic matrix composite body incorporating the zirconium oxide additive. FIG. 25 is a photomicrograph taken at about 1000× corresponding to the ceramic matrix composite body incorporating the Grade TZ-3Y yttrium oxide stabilized zirconium oxide additive. FIG. 26 is a photomicrograph taken at about 1000× corresponding to the ceramic matrix composite body incorporating the zircon powder additive. FIG. 27 is a photomicrograph taken at about 1000× corresponding to the ceramic matrix composite body incorporating the −325 mesh hafnium oxide additive. FIG. 28 is a photomicrograph taken at about 1000× corresponding to the ceramic matrix composite body incorporating the yttrium oxide additive.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention, as defined in the appended claims.

We claim:

1. A method of producing a self-supporting body comprising:
   selecting a parent metal;
   providing a permeable mass comprising at least one property-modifying additive comprising at least one metallic material selected from the group consisting of Nb, Ti, W, Mo, V, Hf, Ta, Cr, Al, Si, Ni and Co, and at least one material selected from the group consisting of (1) boron carbide, (2) a boron source material and a carbon source material and (3) boron carbide and at least one of a boron source material and a carbon source material;
   heating said parent metal in a substantially inert atmosphere to a temperature above its melting point to form a body of molten parent metal and contacting said body of molten parent metal with said permeable mass;
   maintaining said temperature for a time sufficient to permit infiltration of said molten parent metal into said permeable mass and to permit reaction of said molten parent metal with said permeable mass; and
   continuing said infiltration reaction for a time sufficient to produce said self-supporting body, whereby said at least one additive modifies at least one property in said self-supporting body.

2. The method of claim 1 further comprising adding to said metallic material at least one material from the group consisting of VC, NbC, WC, $W_2B_5$, and $Mo_2B_5$.

3. The method of claim 1, wherein said parent metal comprises at least one metal selected from the group consisting of titanium, zirconium and hafnium.

4. The method of claim 1, wherein said substantially inert atmosphere comprises an argon atmosphere.

5. The method of cliam 1, wherein at least one second additive is provided to said permeable mass, said at least one second additive comprising at least one material selected from the group consisting of $Al_2O_3$, MgO, $MgAl_2O_4$, $Y_2O_3$, $La_2O_3$, CaO, $HfO_2$, $SiB_4$, $SiB_6$, $ZrSiO_4$, $Yb_2O_3$ and $ZrO_2$.

6. The method of claim 3, further comprising providing at least one second additive, wherein said at least one second additive comprises at least one material selected from the group consisting of $CeO_2$, TaC, ZrC, SiC, VC, NbC, $ZrB_2$, $TaB_2$, $W_2B_5$ and $Mo_2B_5$.

7. A method of producing a self-supporting body comprising:
   selecting a parent metal;
   providing a permeable mass comprising at least one material selected from the group consisting of (1) boron carbide; (2) a boron source material and a carbon source material and (3) boron carbide and at least one of a boron source material and a carbon source material;
   providing at least one property-modifying additive by application to a least a portion of an interface between said parent metal and said permeable mass;
   heating said parent metal in a substantially inert atmosphere to a temperature above its melting point to form a body of molten parent metal and contacting said body of molten parent metal with said permeable mass;
   maintaining said temperature for a time sufficient to permit infiltration of said molten parent metal into said permeable mass and to permit reaction of said molten parent metal with said permeable mass; and
   continuing sid infiltration reaction for a time sufficient to produce said self-supporting body, whereby said at least one additive modifies at least one property in said self-supporting body.

8. The method of claim 7, werein said parent metal comprises at least one material selected from the group consisting of titanium, zirconium and hafnium.

9. The method of claim 7, werein said substantially inert atmosphere comprises an argon atmosphere.

10. A method of producing a self-supporting body comprising:

selecting a parent metal;

providing a permeable mass comprising at least one material selected from the group consisting of (1) boron carbide, (2) a boron source material and a carbon source material and (3) boron carbide and at least one of a boron source material and a carbon source material;

providing at least one property-modifying additive comprising niobium;

heating said parent metal in a substantially inert atmosphere to a temperature above its melting point to form a body of molten parent metal and contacting said body of molten parent metal with said permeable mass;

maintaining said temperature for a time sufficient to permit infiltration of said molten parent metal into said permeable mass and to permit reaction of said molten parent metal with said permeable mass; and continuing said infiltration reaction for a time sufficient to produce said self-supporting body, whereby said at least one additive modifies at least one property in said self-supporting body.

11. The method of claim 10, wherein said parent metal comprises at least one metal selected from the group consisting of titanium, zirconium and hafnium.

12. The method of claim 10, wherein said substantially inert atmosphere comprises an argon atmosphere.

13. The method of claim 10, wherein said niobium is present in an amount of about 0.5 to about 10 percent by weight.

14. The method of claim 13, wherein said niobium is present in an amount of about 1 to about 5 percent by weight.

15. A self-supporting body made according to claim 1.

* * * * *